US012620537B2

(12) United States Patent
Dai et al.

(10) Patent No.: US 12,620,537 B2
(45) Date of Patent: May 5, 2026

(54) MAGNETIC CIRCUIT SYSTEM WITH ENHANCED INITIAL ELECTROMAGNETIC ATTRACTION AND HIGH-VOLTAGE DC RELAY

(71) Applicant: Xiamen Hongfa Electric Power Controls Co., Ltd., Xiamen (CN)

(72) Inventors: Wenguang Dai, Xiamen (CN); Liji Su, Xiamen (CN); Meng Wang, Xiamen (CN)

(73) Assignee: XIAMEN HONGFA ELECTRIC POWER CONTROLS CO., LTD., Xiamen (CN)

( * ) Notice: Subject to any disclaimer, the term of this patent is extended or adjusted under 35 U.S.C. 154(b) by 251 days.

(21) Appl. No.: 18/404,332

(22) PCT Filed: Jul. 8, 2022

(86) PCT No.: PCT/CN2022/104680

§ 371 (c)(1),
(2) Date: Jan. 4, 2024

(87) PCT Pub. No.: WO2023/280312

PCT Pub. Date: Jan. 12, 2023

(65) Prior Publication Data

US 2025/0087438 A1 Mar. 13, 2025

(30) Foreign Application Priority Data

Jul. 9, 2021 (CN) ......................... 202110779803.1
Jul. 9, 2021 (CN) ......................... 202110780418.9
Jul. 9, 2021 (CN) ......................... 202121565706.4

(51) Int. Cl.
*H01H 50/36* (2006.01)
*H01H 50/18* (2006.01)

(52) U.S. Cl.
CPC ............ *H01H 50/36* (2013.01); *H01H 50/18* (2013.01)

(58) Field of Classification Search
USPC .......................................................... 335/166
See application file for complete search history.

(56) References Cited

U.S. PATENT DOCUMENTS 5,268,662 A 12/1993 Uetsuhara et al.
9,484,173 B2 * 11/2016 Naka ...................... H01H 50/42
(Continued)

FOREIGN PATENT DOCUMENTS

CH 497033 A 9/1970
CN 101984504 A 3/2011
(Continued)

OTHER PUBLICATIONS

English Translation of International Search Report, PCT/CN2022/104680; Mailed Sep. 21, 2022; 3 pages.
(Continued)

*Primary Examiner* — Shawki S Ismail
*Assistant Examiner* — Lisa N Homza
(74) *Attorney, Agent, or Firm* — CANTOR COLBURN LLP

(57) ABSTRACT

Disclosed in the present invention are a magnetic circuit part having an enhanced initial electromagnetic attraction force, and a high-voltage direct-current relay. The magnetic circuit part comprises a coil, a movable magnetic conductor and a static magnetic conductor, wherein the coil, the movable magnetic conductor and the static magnetic conductor are respectively mounted at suitable positions, such that a magnetic pole surface of the movable magnetic conductor and a magnetic pole surface of the static magnetic conductor are in opposite positions with a preset magnetic gap; and one of the two magnetic pole surfaces is provided with a protrusion
(Continued)

that protrudes toward the other magnetic pole surface, and the other magnetic pole surface is provided, at a position corresponding to the protrusion, with a recess in which the protrusion of one of the magnetic pole surfaces can be embedded when the movable magnetic conductor and the static magnetic conductor attract each other. According to the present invention, the initial electromagnetic attraction force can be enhanced under the same volume and power consumption of the coil; or under the same initial electromagnetic attraction force, the volume of the coil is reduced, and the power consumption of the coil is decreased.

20 Claims, 20 Drawing Sheets

(56) References Cited

U.S. PATENT DOCUMENTS

| | | | | |
|---|---|---|---|---|
| 9,564,279 | B2 * | 2/2017 | Naka | H01H 50/42 |
| 2019/0221392 | A1 | 7/2019 | Nishiguchi et al. | |
| 2023/0090245 | A1 * | 3/2023 | Zhong | H01H 50/44<br>335/185 |
| 2023/0178319 | A1 * | 6/2023 | Zhong | H01H 50/14<br>335/196 |
| 2024/0006139 | A1 * | 1/2024 | Zhong | H01H 51/2209 |

FOREIGN PATENT DOCUMENTS

| | | | |
|---|---|---|---|
| CN | 105719910 | A | 6/2016 |
| CN | 108831801 | A | 11/2018 |
| CN | 112837969 | A | 5/2021 |
| CN | 113823529 | A | 12/2021 |
| CN | 114093718 | A | 2/2022 |
| CN | 215869152 | U | 2/2022 |
| CN | 215869153 | U | 2/2022 |
| CN | 215869154 | U | 2/2022 |
| EP | 0380693 | A1 | 8/1990 |
| EP | 1387083 | A2 | 2/2004 |
| EP | 2583295 | B1 | 4/2017 |
| JP | H0246707 | A | 2/1990 |
| JP | 2001135520 | A | 5/2001 |
| JP | 2003318023 | A | 11/2003 |
| JP | 2014072034 | A | 4/2014 |
| KR | 20150137804 | A | 12/2015 |
| WO | 2009003399 | A1 | 1/2009 |

OTHER PUBLICATIONS

Japanese Patent Office Notice of Allowance; JP Application No. 2024500039; Mailed Jul. 1, 2025; 5 pages.

Notification of Transmittal of the European Patent Office Extended European Search Report; European Patent No. 25204638.8; Dec. 19, 2025; 9 pages.

* cited by examiner

MAGNETIC CIRCUIT SYSTEM WITH ENHANCED INITIAL ELECTROMAGNETIC ATTRACTION AND HIGH-VOLTAGE DC RELAY

CROSS-REFERENCE TO RELATED APPLICATION

This application is a national stage of International PCT Application No. PCT/CN2022/104680, filed on Jul. 8, 2022, which claims priority to Chinese Patent Applications No. 202110779803.1, 202110780418.9 and 202121565706.4 filed on Jul. 9, 2021, the contents of which are hereby incorporated by reference in their entirety.

TECHNICAL FIELD

The present disclosure relates to the technical field of relays, in particular to a magnetic circuit system with enhanced initial electromagnetic attraction and a high-voltage DC relay.

BACKGROUND

A relay is an electronic control device that consists of a control system (also known as an input loop) and a controlled system (also known as an output loop). It is commonly used in automatic control circuits. Essentially, it acts as an automatic switch that employs a small current to control a larger current, enabling functions such as automatic adjustment, safety protection, and circuit conversion. A high-voltage DC relay is specifically designed to handle high power. It offers unparalleled reliability and a longer service lifespan compared to conventional relays, making it extensively utilized in various fields, including the automotive industry, particularly in a realm of new energy vehicles.

On one hand, as a driving range of the new energy vehicle increases, the battery capacity and the short-circuit current of a battery pack also increase. This necessitates a high-voltage DC relay to possess robust anti-short-circuit ability. On the other hand, there is a demand for reducing power consumption in the high-voltage DC relay to minimize energy loss. Moreover, with the growing need for space optimization in the new energy vehicle, there is a requirement for the high-voltage DC relay to have a smaller dimension. In general, the high-voltage DC relay used in the new energy vehicle is expected to exhibit strong electromagnetic attraction, low drive power consumption, and compact size. However, the existing designs face a contradiction between the need for a powerful electromagnetic attraction to withstand short-circuit current, which requires larger coil winding space and higher coil driving power consumption, and the desire for a smaller size and lower power consumption in high-voltage DC relays. This contradiction hinders an effective application of the high-voltage DC relay in the fields such as the new energy vehicle.

SUMMARY

A magnetic circuit system with enhanced initial electromagnetic attraction, comprising a coil, a movable magnetizer, a reset spring and a stationary magnetizer: the coil, the movable magnetizer and the stationary magnetizer being respectively provided at an adaptive position, so that a magnetic pole surface of the movable magnetizer and a magnetic pole surface of the stationary magnetizer are in opposite positions with preset magnetic gaps, and the movable magnetizer moves towards the stationary magnetizer when the coil is energized: the reset spring is adapted between an intermediate portion of the movable magnetizer and an intermediate portion of the stationary magnetizer, and the two magnetic pole surfaces correspondingly matched with each other are respectively in a ring shape and respectively has an inner ring and an outer ring: wherein one of the two magnetic pole surfaces correspondingly matched with each other is provided with a protrusion protruding to the other magnetic pole surface, and a recess is provided in the other magnetic pole surface at a position corresponding to the protrusion, where the protrusion can be embedded into the recess when the movable magnetizer and the stationary magnetizer are attracted with each other: each of the protrusion and the recess has distances from the inner ring and the outer ring of corresponding magnetic pole surfaces: when the coil is energized, a direction of a resultant force of attractive forces between the protrusion and the recess generated on both sides of a vertical section in which the protrusion and the recess are matched with each other is always along a direction in which the movable magnetizer moves to the stationary magnetizer, and the protrusion is utilized to reduce a magnetic gap between the two magnetic pole surfaces at the protrusion, thereby reducing magnetic resistance and increasing initial electromagnetic attraction.

According to an embodiment of the present disclosure, a top face of the protrusion is a plane, and in a state that the protrusion is fully embedded in the recess, gaps between side faces of the protrusion and corresponding side walls of the recess are completely identical, so that the direction of the resultant force of the attractive forces generated between the protrusion and the recess when the coil is energized is always along the direction in which the movable magnetizer moves to the stationary magnetizer.

According to an embodiment of the present disclosure, a distance from a side edge of the top face of the protrusion to a side edge of a corresponding notch of the recess is smaller than the preset magnetic gap between the two magnetic pole surfaces.

According to an embodiment of the present disclosure, in the state that the protrusion is fully embedded in the recess, a gap between the side face of the protrusion and the side wall of the recess is not smaller than a distance between the top face of the protrusion and a bottom face of the recess, and the distance between the top face of the protrusion and the bottom face of the recess is not smaller than a distance between two magnetic pole surfaces.

According to an embodiment of the present disclosure, the side face of the protrusion is one or a combination of more than two of a vertical surface, an inclined surface and a curved surface, and in the vertical section, the two side faces of the protrusion are symmetrical.

According to an embodiment of the present disclosure, there are one or more protrusions on one magnetic pole surface, and there are one or more recesses on the other magnetic pole surface at a corresponding position.

According to an embodiment of the present disclosure, the protrusion is a separate part, and the protrusion is fixed on the magnetic pole surface.

According to an embodiment of the present disclosure, the protrusion is an integral structure formed on the magnetic pole surface.

According to an embodiment of the present disclosure, the protrusion is in a protruding shaft shape.

According to an embodiment of the present disclosure, the protrusion is in a strip shape.

According to an embodiment of the present disclosure, the protrusion is linear, arc-shaped or annular.

According to an embodiment of the present disclosure, a sum of areas of the top faces of the protrusions on the magnetic pole surface is less than a remaining area of the magnetic pole surface from which all of the protrusions are removed.

According to an embodiment of the present disclosure, one of the magnetic pole surfaces is provided in the movable magnetizer and the other magnetic pole surface of the magnetic pole surfaces is provided in the stationary magnetizer.

According to an embodiment of the present disclosure, the movable magnetizer is a movable core, and the stationary magnetizer is a stationary core or a yoke plate.

According to another aspect of the present disclosure, a high-voltage DC relay, comprising the magnetic circuit system with enhanced initial electromagnetic attraction as above mentioned.

The present disclosure will be further described in detail in conjunction with the accompanying drawings and embodiments. However, the magnetic circuit system with enhanced initial electromagnetic attraction and the high-voltage DC relay of the present disclosure are not limited to the embodiments.

BRIEF DESCRIPTION OF THE DRAWINGS

The above and other features and advantages of the present disclosure will become more apparent by describing in detail exemplary embodiments thereof with reference to the accompanying drawings.

DETAILED DESCRIPTION

Figure 1:
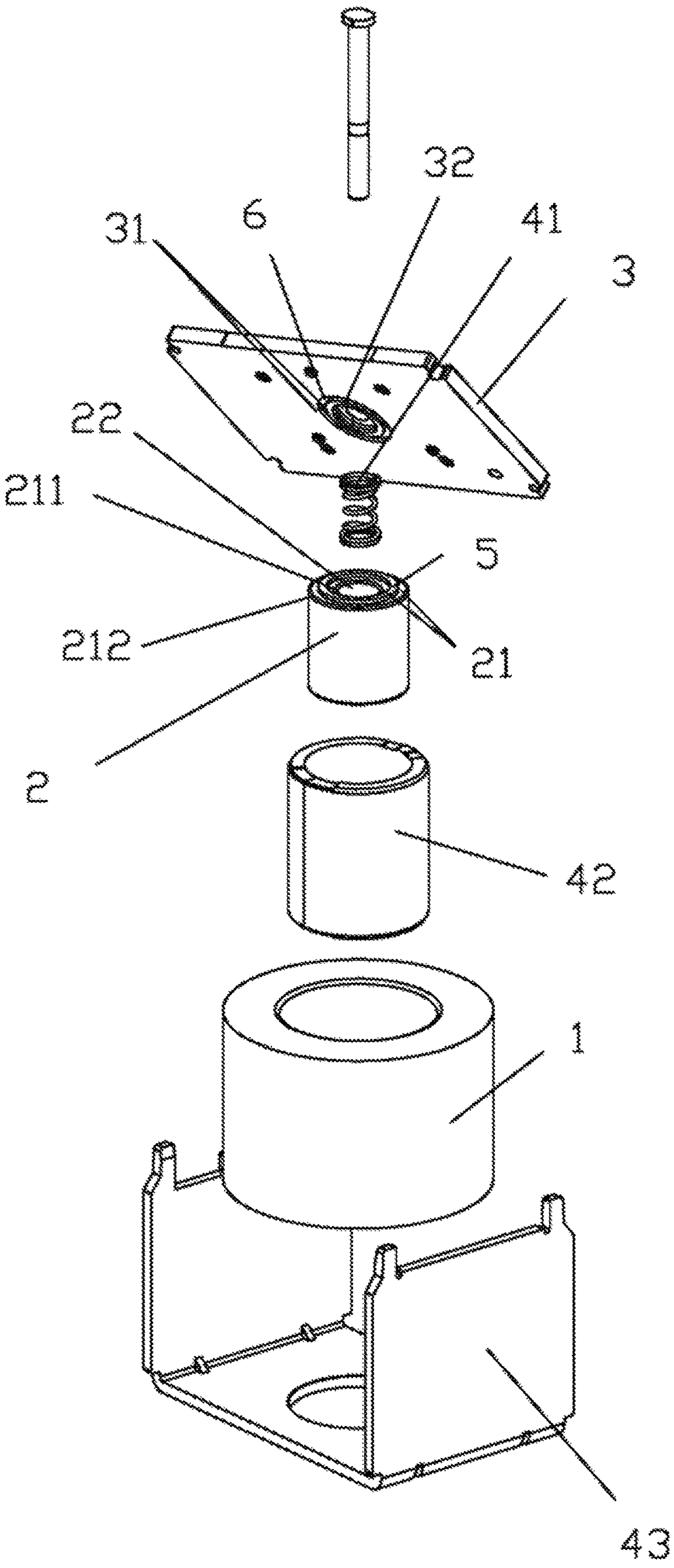
FIG. 1 is a perspective exploded view of a first embodiment of a magnetic circuit system with enhanced initial electromagnetic attraction according to the present disclosure.
Figure 2:
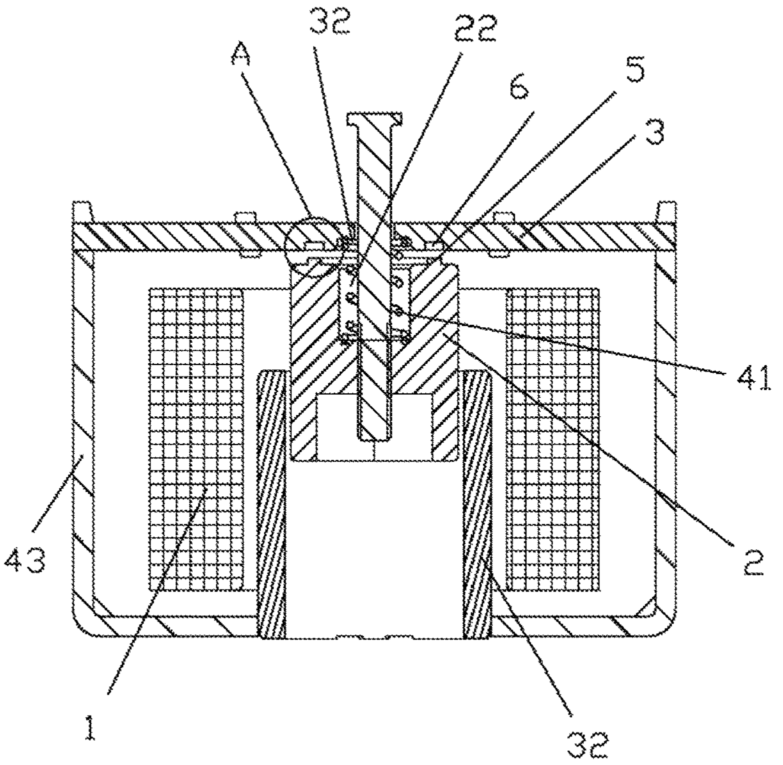
FIG. 2 is a cross-sectional view of the magnetic circuit system shown in FIG. 1 in the state before a coil is energized.

Now, the exemplary implementations will be described more completely with reference to the accompanying drawings. However, the exemplary implementations can be implemented in various forms and should not be construed as limiting the implementations as set forth herein. Although terms having opposite meanings such as "up" and "down" are used herein to describe the relationship of one component relative to another component, such terms are used herein only for the sake of convenience, for example, "in the direction illustrated in the figure". It can be understood that if a device denoted in the drawings is turned upside down, a component described as "above" something will become a component described as "under" something. When a structure is described as "above" another structure, it probably means that the structure is integrally formed on another structure, or, the structure is "directly" disposed on another structure, or, the structure is "indirectly" disposed on another structure through an additional structure.

Words such as "one", "an/a", "the" and "said" are used herein to indicate the presence of one or more elements/component parts/and others. Terms "including", "comprising" and "having" have an inclusive meaning which means that there may be additional elements/component parts/and others in addition to the listed elements/component parts/and others. Terms "first", "second" and "third" are used herein only as markers, and they do not limit the number of objects modified after them.

The First Embodiment of Magnetic circuit system with Enhanced Initial Electromagnetic Attraction.

Referring to FIGS. 1 to 6, a magnetic circuit system with enhanced initial electromagnetic attraction of the present disclosure includes a coil 1, a movable magnetizer 2, a reset spring 41 and a stationary magnetizer 3. The coil 1, the movable magnetizer 2 and the stationary magnetizer 3 are respectively installed in adaptive positions, so that a magnetic pole surface 21 of the movable magnetizer 2 and a magnetic pole surface 31 of the stationary magnetizer 3 are in opposite positions with a preset magnetic gap, and the movable magnetizer 2 is attracted to the stationary magnetizer 3 when the coil 1 is energized: the reset spring 41 is adapted between a middle of the movable magnetizer 2 and a middle of the stationary magnetizer 3, so that two magnetic pole surfaces correspondingly matched are annular: the magnetic pole surface 21 of the movable magnetizer 2 is annular, and the magnetic pole surface 31 of the stationary magnetizer 3 is also annular.

In this embodiment, the movable magnetizer 2 is a movable core, and a groove 22 into which the reset spring 41 may be installed is provided in the middle of the movable core. In a face of the movable core 2 facing the stationary magnetizer 3, a pole surface 21 of the movable core 2 is annular since the groove 22 is provided in the middle of the movable core. The stationary magnetizer 3 is a yoke plate, and a groove 32 into which the reset spring 41 may be installed is provided in the middle of the yoke plate 3. A magnetic pole surface 31 of the yoke plate 3 is an annular region corresponding to the annular magnetic pole surface 21 of the movable core 2.

The magnetic circuit system further includes a magnetic sleeve 42 and a U-shaped yoke 43, wherein the coil 1 is fitted into a U-shaped opening of the U-shaped yoke 43, and the magnetic sleeve 42 is fitted in a middle through hole of the coil 1, and a bottom end of the magnetic sleeve 42 is connected with the U-shaped yoke 43. The movable core 2 is movably fitted in the middle through hole of the coil 1 and the middle through hole of the magnetic sleeve 42, and an upper end face of the movable core 2 is set as a magnetic pole surface 21. The yoke plate 3 is installed at an upper end of the U-shaped yoke 43, above the coil 1 and the movable core 2. The reset spring 41 is installed between the movable core 2 and the yoke plate 3 to realize the resetting of the movable core. A lower end face of the yoke plate 3 is set as a magnetic pole surface 31, and the movable core 2 moves upward to attract the yoke plate 3 when the coil 1 is energized.

In this embodiment, one of the two magnetic pole surfaces 21, 31 is provided with a protrusion 5 protruding in a direction of the other magnetic pole surface 31. In this embodiment, the protrusion 5 is provided on the movable core 2: in the other magnetic pole surface 31, a recess 6 into which the protrusion 5 is embedded when the movable core 2 and the yoke plate 3 are attracted with each other is provided at a position corresponding to the protrusion 5, that is, the yoke plate 3 is provided with the recess 6, and each of the protrusion 5 and the recess 6 correspondingly have a certain distance from an inner ring and an outer ring in an annular shape of the magnetic pole surface.

Figure 3:
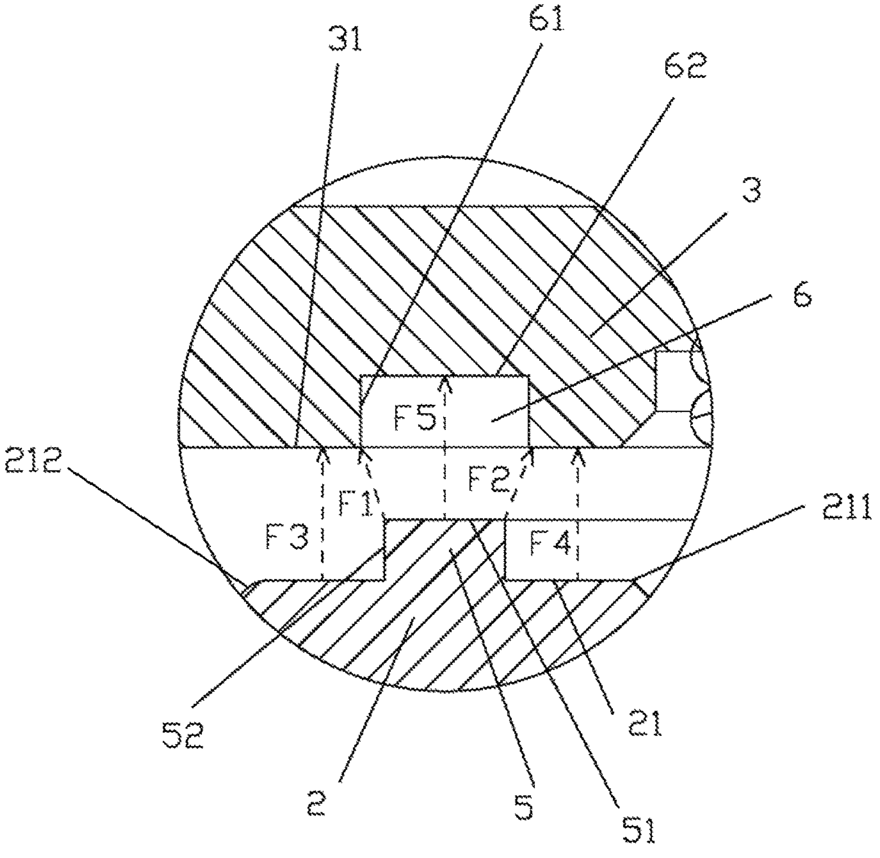
FIG. 3 is an enlarged schematic view of part A in FIG. 2.
Figure 5:
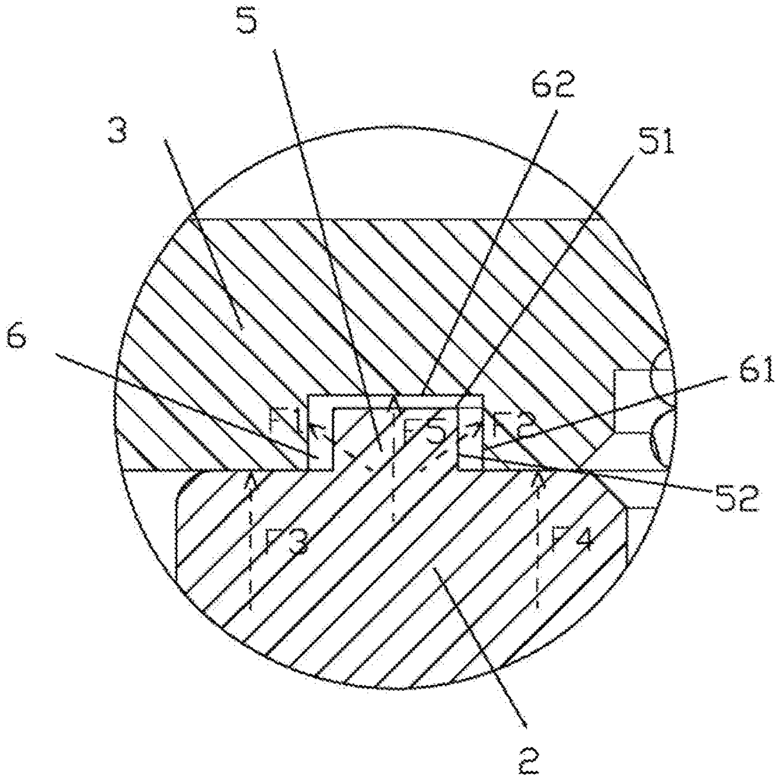
FIG. 5 is an enlarged schematic view of part B in FIG. 4.
Figure 6:
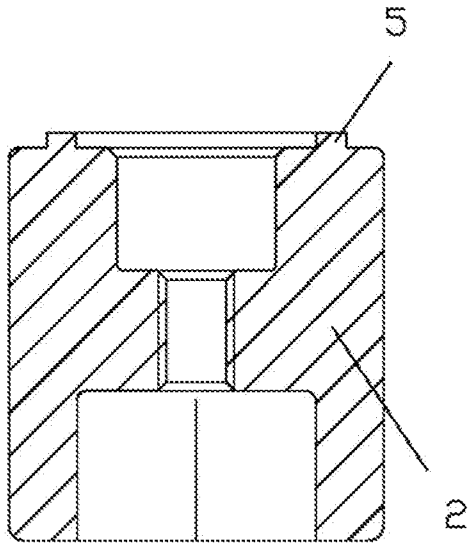
FIG. 6 is a cross-sectional view of the movable core in the magnetic circuit system shown in FIG. 1.

As an example of the movable core 2, the protrusion 5 of the movable core 2 has a certain distance from an inner ring 211 of the magnetic pole surface 21, and this distance may be set as required. The protrusion 5 of the movable core 2 also has a certain distance from an outer ring 212 of the pole surface 21, and this distance may also be set as required. That is to say, the protrusion 5 of the movable core 2 may not be positioned at the inner ring 211 and the outer ring 212 of the magnetic pole surface 21: when the coil 1 is energized, a direction of a resultant force of the attractive force generated in a vertical section where the protrusion 5 and the recess 6 are matched (as shown in FIGS. 3 and 5) between the protrusion 5 and the recess 6 is always along a direction in which the movable core 2 moves to the yoke plate 3. This allows for the utilization of the protrusion 5 to reduce the magnetic gap between the two magnetic pole surfaces 21 and 31 at the protrusion, thereby decreasing magnetic resistance and increasing the initial electromagnetic attraction.

In this embodiment, one protrusion 5 is provided on the magnetic pole surface 21 of the movable core 2, and correspondingly, one recess 6 is provided on the magnetic pole surface 31 of the yoke plate 3.

In this embodiment, the protrusion 5 of the magnetic pole surface 21 of the movable core 2 is an integral structure formed on the magnetic pole surface 21 of the movable core 2.

In this embodiment, the protrusion 5 on the magnetic pole surface 21 of the movable core 2 is in a strip shape.

In this embodiment, the protrusion 5 on the magnetic pole surface 21 of the movable core 2 is annular.

In this embodiment, two opposite side faces of the protrusion 5 on the magnetic pole surface 21 of the movable core 2 are vertical faces, and the two side faces of the protrusion 5 are symmetrical in the vertical section (as shown in FIGS. 3 and 5).

As shown in FIG. 3 and FIG. 5, in this embodiment, a top face 51 of the protrusion 5 is a plane, and in the case that the protrusion 5 is fully embedded in the recess 6, the gaps between side faces 52 of the protrusion 5 and side walls 61 of the recess 6 are completely identical, so that when the coil 1 is energized, a resultant force direction of the force generated between the protrusion 5 and the recess 6 is always along the direction where the movable core 2 moves to the yoke plate 3.

In this embodiment, an area of the top face of the protrusion 5 of the magnetic pole surface 21 of the movable core 2 is smaller than a remaining area of the magnetic pole surface 21 of the movable core 2 from which the protrusion 5 is removed.

In this embodiment, a protruding height of the protrusion 5 of the magnetic pole surface 21 of the movable core 2 is smaller than a preset magnetic gap between the two magnetic pole surfaces 21 and 31, and a distance from a side edge at the top face of the protrusion 5 to a side wall of the recess 6 corresponding to a notch is smaller than a preset magnetic gap between the two magnetic pole surfaces 21 and 31.

In this embodiment, when the protrusion 5 of the magnetic pole surface 21 of the movable core 2 is totally embedded in the recess 6 of the magnetic pole surface 31 of the yoke plate 3, the gap between the side face 52 of the protrusion 5 and the side wall 61 of the recess 6 is not smaller than a distance between the top face 51 of the protrusion 5 and the bottom face 62 of the recess 6, and the distance between the top face 51 of the protrusion 5 and the bottom face 62 of the recess 6 is not smaller than the distance between the two magnetic pole surfaces 21 and 31, to ensure a holding force in the state of the full attraction.

As shown in FIG. 3, when the coil 1 is just energized, an attractive force may be generated between the movable core 2 and the yoke plate 3, and includes attractive forces F1 and F2 between two side edges of the protrusion 5 of the movable core 2 and the two corresponding side edges of the recess 6 of the yoke plate 3, an attractive force F5 between the top face 51 of the protrusion of the movable core 2 and the bottom face 62 of the recess 6 of the yoke plate 3, and attractive forces F3 and F4 between the magnetic pole surfaces 21 on both sides of the protrusion 5 and the magnetic pole surfaces 31 on both sides of the recess 6.

When the coil 1 is just energized, gaps at the attractive forces F1 and F2 are smaller than gags at the attractive forces F3, F4 and F5, the attractive forces F1 and F2 are greater, and the gap at the attractive force F1 is equal to the gap at the attractive force F2. The resultant force of the attractive forces F1 and F2 is along a direction where the movable core 2 moves to the yoke plate 3. Due to the attractive forces F1 and F2, the initial electromagnetic attraction can be enhanced.

During the process from activating the magnetic circuit system to achieving the full engagement between the magnetic pole surface 21 of the movable core 2 and the magnetic pole surface 31 of the yoke plate 3, the gaps at the attractive forces F1, F2 remain the same, and the attractive forces are symmetrical, and the resultant force is still in the direction where the movable core 2 is attracted to the yoke plate 3, and as the gaps at the attractive forces F3, F4 and F5 become smaller, the attractive forces F3, F4 and F5 gradually increase and become dominant: after the magnetic pole surface 21 of the movable core 2 and the magnetic pole surface 31 of the yoke plate 3 are fully attracted and maintained in position, as shown in FIG. 5, the attractive forces F3, F4, F5 reach the maximum values, and the attractive forces F1, F2 are smaller, the resultant force of the attractive forces F1, F2 are still in the direction where the movable core 2 is attracted to the yoke plate 3.

A high-voltage DC relay of the present disclosure includes the magnetic circuit system with enhanced initial electromagnetic attraction.

Figure 7:
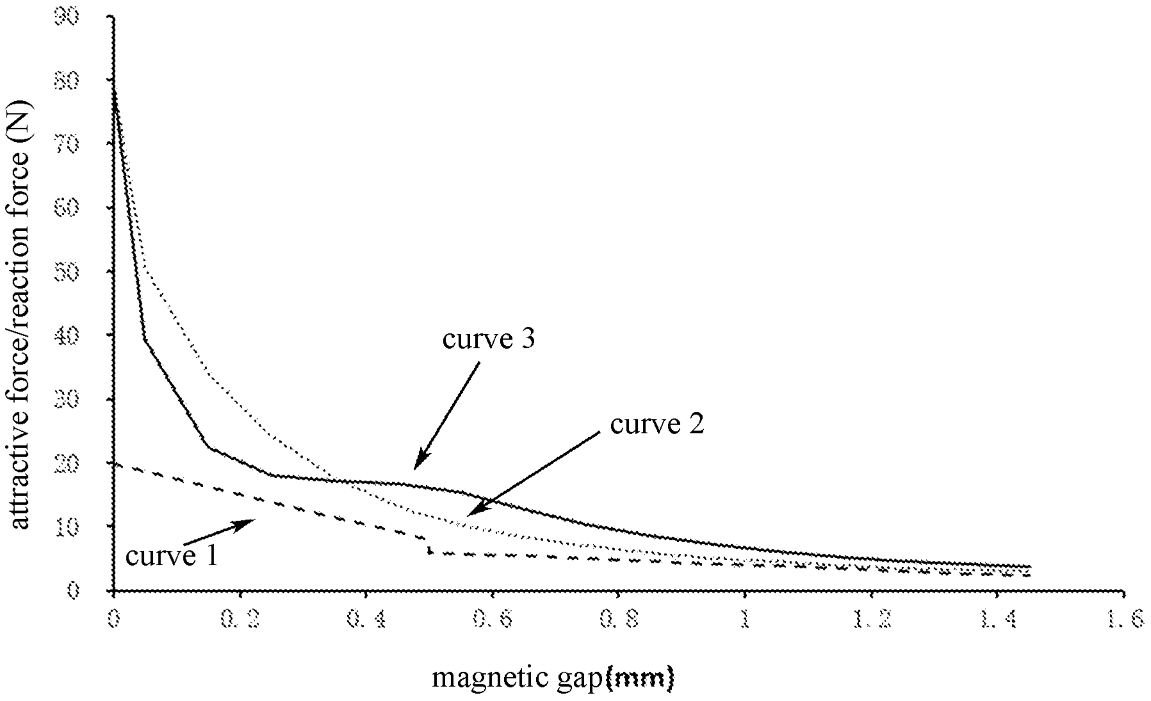
FIG. 7 is a schematic view of relationship between a magnetic gap in the magnetic circuit system shown in FIG. 1 and attractive force/reaction force.

Referring to FIG. 7, relationship between attraction/reaction force and a magnetic gap in the high-voltage DC relay of the present disclosure is shown. In the figure, a curve 1 is a reaction force curve of movement of a relay, a curve 2 is an attractive force curve of the relay in the prior art, and a curve 3 is an attractive force curve of the relay of the present disclosure. At the moment when the relay is activated, the magnetic gap is the largest, as shown in a right side of FIG. 7 (i.e., 1.45 mm). At this time, a driving voltage is given to the coil, assuming it is 7 V, an electromagnetic attraction (in the right side of the curve 2 as shown in FIG. 7) is generated in the prior art. According to the present disclosure, the movable core 2 is provided with the protrusion 5 to reduce the magnetic gap, reduce initial magnetic resistance, improve initial attractive force, and reduce power consumption for activation. At this time, the driving voltage is still 7V, greater electromagnetic attractive force is generated (as shown in the right side of the curve 3 in FIG. 7). As can be seen from FIG. 7, the curve 2 and the curve 3 intersect at a magnetic gap of 0.35 mm, and the electromagnetic attractive force of the present discloser is greater than the electromagnetic attractive force of the prior art at a magnetic gap of 1.45 mm to 0.35 mm. In the case that the electromagnetic attractive force is generated as same as that in the prior art, less driving voltage is needed, so that the power consumption for driving can be reduced. The magnetic pole surface 31 of the yoke plate 3 is provided with the recess 6 at a position corresponding to the protrusion 5 of the movable core 2, due to the cooperation of the protrusion 5 and the recess 6, the magnetic pole continues to move until the core is completely closed, that is, the magnetic pole surface 21 of the movable core 2 and the magnetic pole surface 31 of the yoke plate 3 are attracted together.

According to the magnetic circuit system with enhanced initial electromagnetic attraction and the high-voltage DC relay of the present disclosure, the magnetic pole surface 21 of the movable core 2 is provided with a protrusion 5 protruding to the magnetic pole surface 31 of the yoke plate 3, and the magnetic pole surface 31 of the yoke plate 3 is provided with a recess 6 corresponding to the protrusion 5, into which the protrusion 5 of the magnetic pole surface 21 of the movable core 2 is embedded when the movable core 2 is attracted to the yoke plate 3, and a direction of the resultant force of the attractive forces generated between the protrusion 5 and the recess 6 when the coil 1 is energized is always along a direction where the movable core 2 is attracted to the yoke plate 3, and the attractive forces are greater. With this structure of the present disclosure, the protrusion 5 of the magnetic pole surface 21 of the movable core 2 is employed to reduce the magnetic gap between the two magnetic pole surfaces 21 and 31 at the protrusion, to reduce the magnetic resistance and increase the initial electromagnetic attraction, or to reduce the volume and power consumption of the coil under the same initial electromagnetic attraction. In the present disclosure, the recess 6 of the magnetic pole surface 31 of the yoke plate 3 is matched with the protrusion 5 of the magnetic pole surface 21 of the movable core 2, so that full attraction of the two magnetic pole surfaces 21 and 31 can be ensured. The protrusion 5 of the magnetic pole surface 21 of the movable core 2 and the recess 6 of the magnetic pole surface 31 of the yoke plate 3 of the present disclosure are located outside the reset spring 41, so that the limited magnetic pole space can be reasonably utilized without occupying the space of the reset spring (its resetting function cannot be affected). Especially, in this embodiment, the annular protrusion 5 is used to surround the middle reset spring 41, and the protrusion and the recess are matched in an annular 360-degree vertical section, so that the initial attractive force can be improved to the maximum extent.

Figure 8:
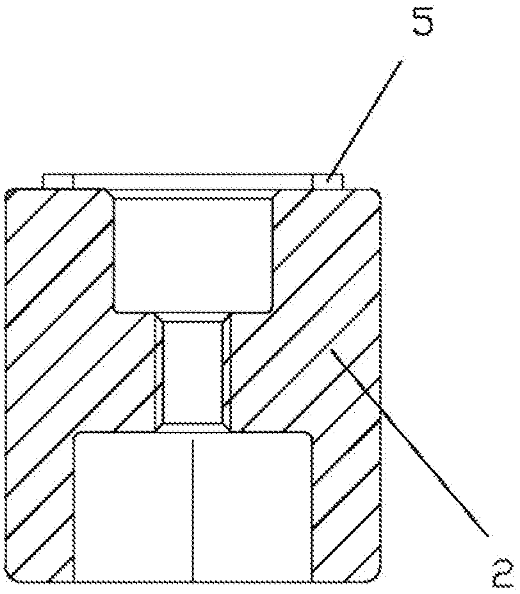
FIG. 8 is a cross-sectional view of a movable core in the second embodiment of the magnetic circuit system with enhanced initial electromagnetic attraction according to the present disclosure.

The Second Embodiment of Magnetic circuit system with Enhanced Initial Electromagnetic Attraction Referring to FIG. 8, the second embodiment of the magnetic circuit system with enhanced initial electromagnetic attraction is different from the first embodiment of the present disclosure in that the protrusion 5 is a separate part, and the protrusion 5 is fixed on the magnetic pole surface 21 of the movable core 2.

Figure 9:
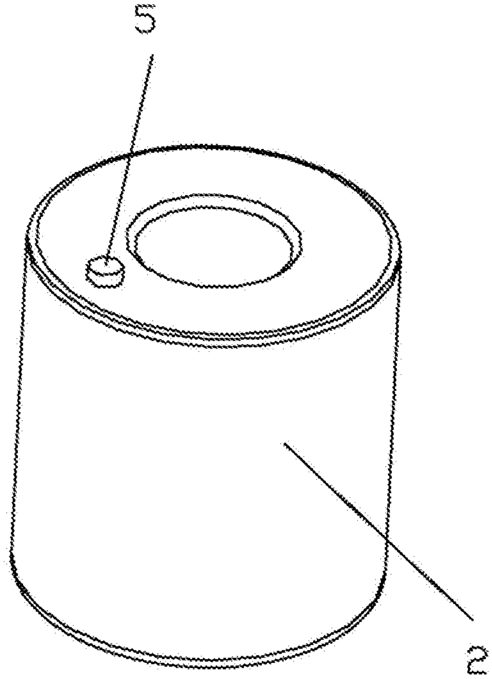
FIG. 9 is a perspective view of the movable core in the third embodiment of the magnetic circuit system with enhanced initial electromagnetic attraction according to the present disclosure.

The Third Embodiment of Magnetic circuit system with Enhanced Initial Electromagnetic Attraction Referring to FIG. 9, the third embodiment of the magnetic circuit system with enhanced initial electromagnetic attraction is different from the first embodiment of the present disclosure in that the protrusion 5 is in a shape of a protruding shaft.

The protrusion 5 in the shape of the protruding shaft may also be a separate part, and the protrusion 5 in the shape of the protruding shaft is fixed on the magnetic pole surface 21 of the movable core 2.

The Fourth Embodiment of Magnetic circuit system with Enhanced Initial Electromagnetic Attraction.

Figure 10:
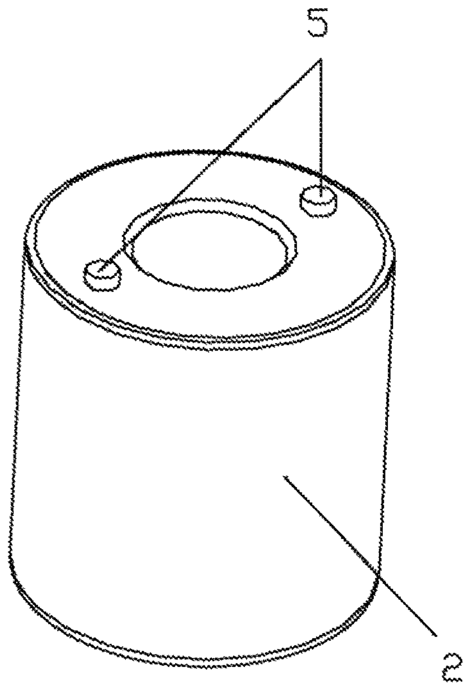
FIG. 10 is a perspective view of a movable core in the fourth embodiment of the magnetic circuit system with enhanced initial electromagnetic attraction according to the present disclosure.

Referring to FIG. 10, the fourth embodiment of the magnetic circuit system with enhanced initial electromagnetic attraction is different from the third embodiment of the present disclosure in that there are two protrusions 5 in the shape of protruding shafts.

The Fifth Embodiment of Magnetic circuit system with Enhanced Initial Electromagnetic Attraction.

Figure 11:
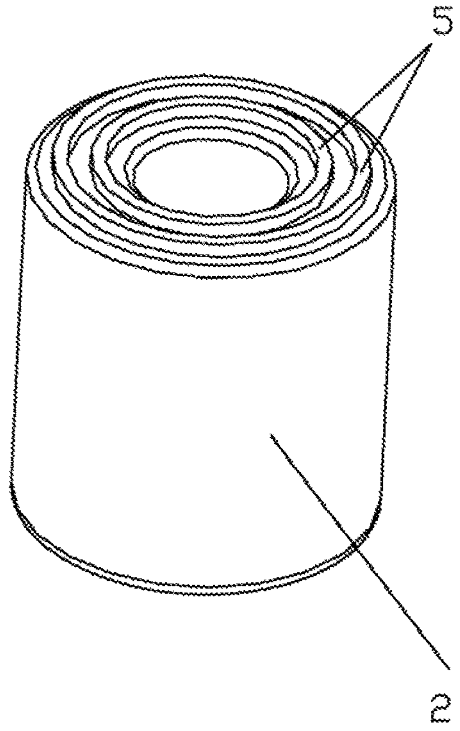
FIG. 11 is a perspective view of a movable core in the fifth embodiment of the magnetic circuit system with enhanced initial electromagnetic attraction according to the present disclosure.
Figure 12:
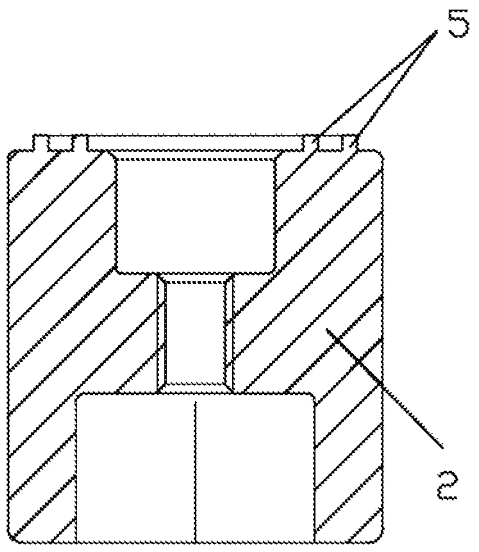
FIG. 12 is a cross-sectional view of FIG. 11.

Referring to FIG. 11 and FIG. 12, the fifth embodiment of the magnetic circuit system with enhanced initial electromagnetic attraction is different from the first embodiment of the present disclosure in that there are two annular protrusions 5 and two corresponding recesses 6 on the magnetic pole surface 31 of the yoke plate 3.

The two annular protrusions 5 may also be separate parts, and the two protrusions 5 are fixed on the magnetic pole surface 21 of the movable core 2.

The Sixth Embodiment of Magnetic circuit system with Enhanced Initial Electromagnetic attraction.

Figure 13:
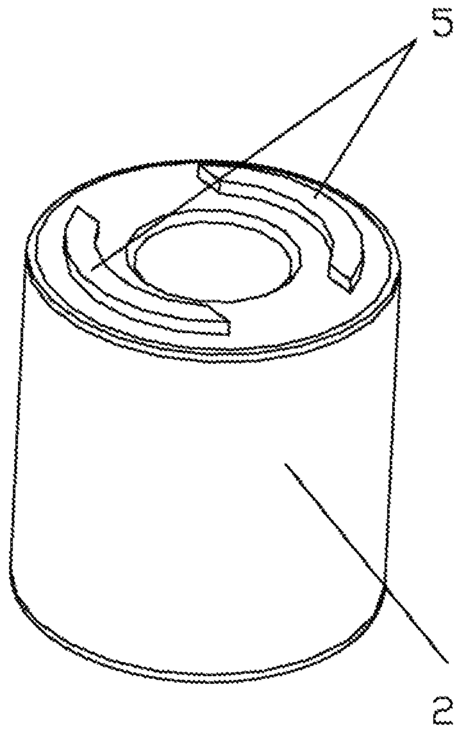
FIG. 13 is a perspective view of a movable core in the sixth embodiment of the magnetic circuit system with enhanced initial electromagnetic attraction according to the present disclosure.

Referring to FIG. 13, the sixth embodiment of the magnetic circuit system with enhanced initial electromagnetic attraction is different from the first embodiment of the present disclosure in that strip-shaped protrusions 5 are arc-shaped, and there are two arc-shaped protrusions 5, and two corresponding shape-matched recesses 6 of the magnetic pole surface 31 of the yoke plate 3.

The two arc-shaped protrusions 5 may also be separate parts, and the two protrusions 5 are fixed on the magnetic pole surface 21 of the movable core 2.

The Seventh Embodiment of Magnetic circuit system with Enhanced Initial Electromagnetic Attraction.

Figure 14:
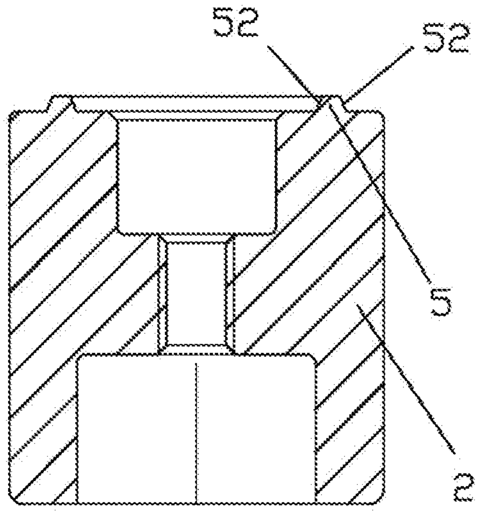
FIG. 14 is a cross-sectional view of a movable core in the seventh embodiment of the magnetic circuit system with enhanced initial electromagnetic attraction according to the present disclosure.

Referring to FIG. 14, the seventh embodiment of the magnetic circuit system with enhanced initial electromagnetic attraction is different from the first embodiment of the present disclosure in that the two side faces 52 of the protrusion 5 of the movable core 2 are inclined faces. In this embodiment, the two side faces 52 of the protrusion 5 of the movable core 2 are set as inclined faces, and the two side walls of the recess 6 of the yoke plate 3 are correspondingly set as shape-matched inclined faces. With such matched structure, the protruding height of the protrusion 5 of the magnetic pole surface 21 of the movable core 2 is designed to be smaller than the preset magnetic gap between the two magnetic pole surfaces 21 and 31, or the protruding height of the protrusion 5 of the magnetic pole surface 21 of the movable core 2 is designed to be larger than the preset magnetic gap between the two magnetic pole surfaces 21 and 31. In the latter case, when the coil is not energized, a part of the protrusion 5 of the magnetic pole surface 21 of the movable core 2 may not be embedded in the recess 6 of the yoke plate 3.

The Eighth Embodiment of Magnetic circuit system with Enhanced Initial Electromagnetic Attraction.

Figure 15:
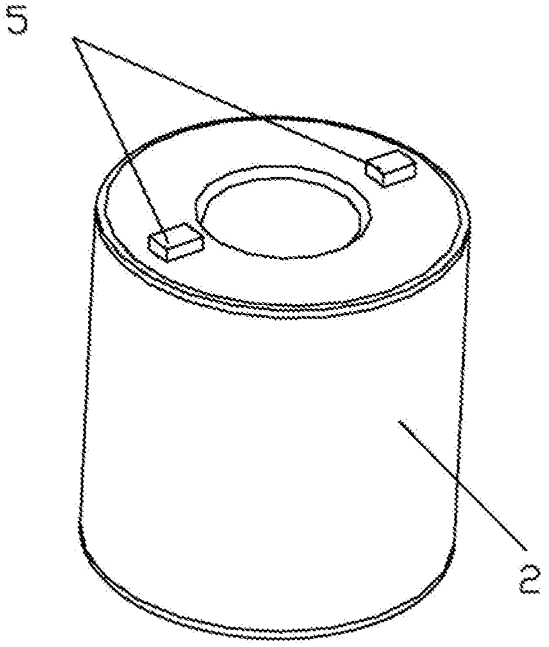
FIG. 15 is a perspective view of a movable core in the eighth embodiment of the magnetic circuit system with enhanced initial electromagnetic attraction according to the present disclosure.

Referring to FIG. 15, the eighth embodiment of the magnetic circuit system with enhanced initial electromagnetic attraction is different from the sixth embodiment according to the present disclosure in that the strip-shaped protrusion 5 is in a shape of straight line.

The Ninth Embodiment of Magnetic circuit system with Enhanced Initial Electromagnetic Attraction.

Figure 16:
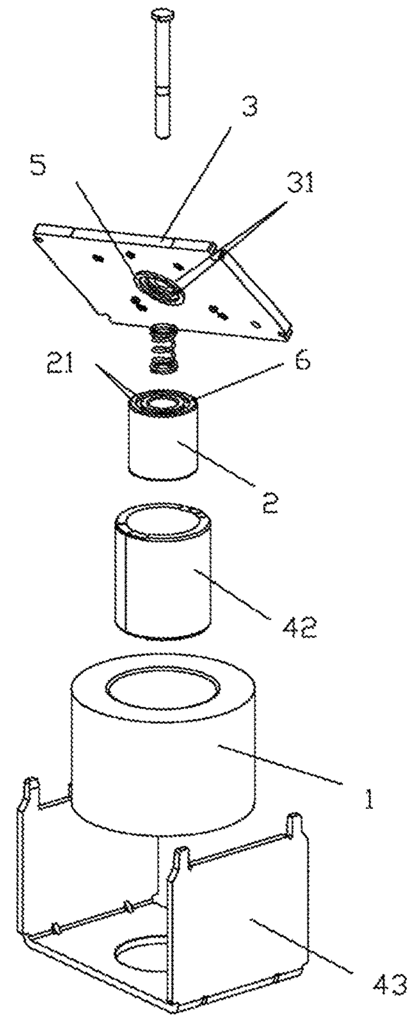
FIG. 16 is a perspective exploded view of the ninth embodiment of the magnetic circuit system with enhanced initial electromagnetic attraction according to the present disclosure.
Figure 17:
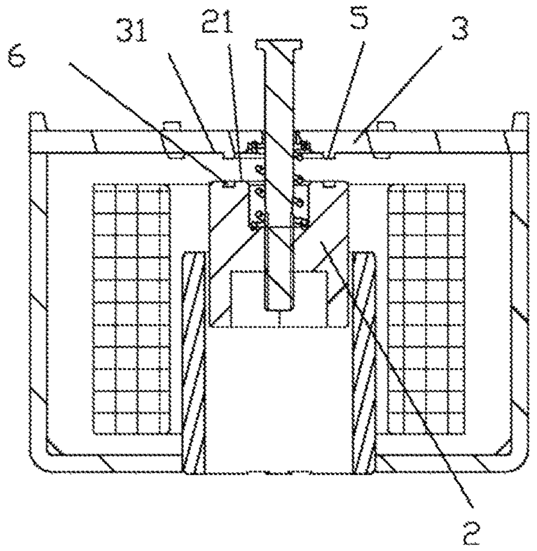
FIG. 17 is a cross-sectional view of FIG. 16 before the coil is energized.

Referring to FIG. 16 and FIG. 17, the ninth embodiment of the magnetic circuit system with enhanced initial electromagnetic attraction is different from the first embodiment of the present disclosure in that the protrusion 5 is provided at the magnetic pole surface 31 of the yoke plate 3, and the recess 6 is provided at the magnetic pole surface 21 of the movable core 2.

The Tenth Embodiment of Magnetic circuit system with Enhanced Initial Electromagnetic Attraction.

Figure 18:
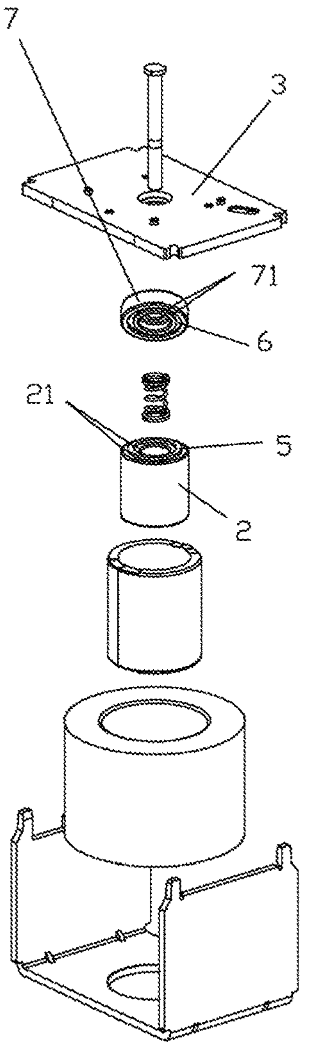
FIG. 18 is a perspective exploded view of the tenth embodiment of the magnetic circuit system with enhanced initial electromagnetic attraction according to the present disclosure.
Figure 19:
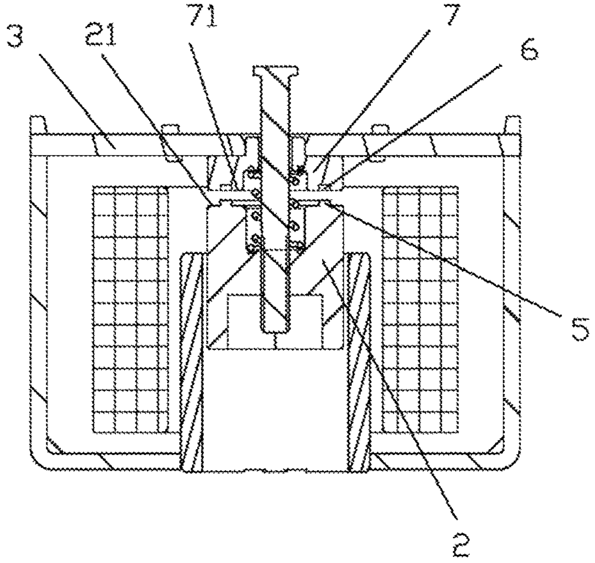
FIG. 19 is a cross-sectional view of FIG. 18 in a state before the coil is energized.

Referring to FIG. 18 and FIG. 19, the tenth embodiment of the magnetic circuit system with enhanced initial electromagnetic attraction is different from the first embodiment of the present disclosure in that two stationary magnetizers are included, in addition to the yoke plate 3, a stationary core 7 is provided and assembled with the yoke plate 3 together, and a lower end face of the stationary core 7 is matched with the magnetic pole surface 21 of the movable core 2, that is, the lower end face of the stationary core 7 is set as the magnetic pole surface 71 matched with the magnetic pole surface 21 of the movable core 2. Therefore, in this embodiment, the recess is provided at the magnetic pole surface 71 of the stationary core 7.

The Eleventh Embodiment of Magnetic circuit system with Enhanced Initial Electromagnetic Attraction.

Figure 20:
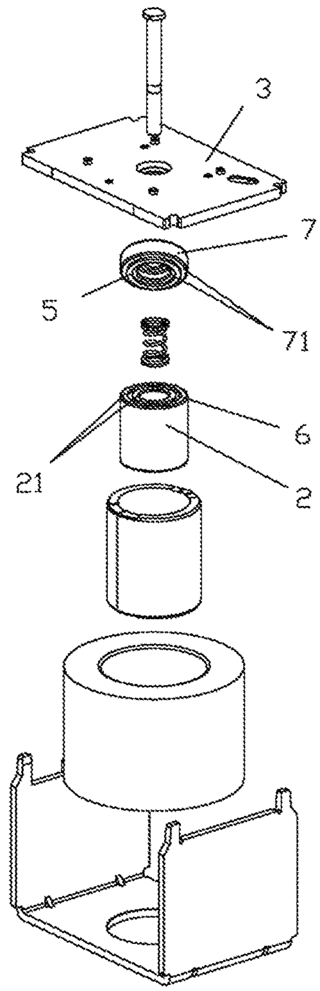
FIG. 20 is a perspective exploded view of the eleventh embodiment of the magnetic circuit system with enhanced initial electromagnetic attraction according to the present disclosure.
Figure 21:
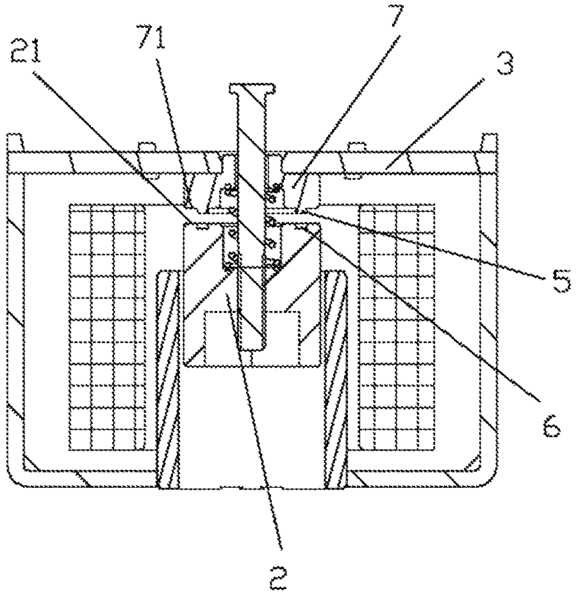
FIG. 21 is a cross-sectional view of FIG. 20 in a state before the coil is energized.

Referring to FIG. 20 and FIG. 21, the eleventh embodiment of the magnetic circuit system with enhanced initial electromagnetic attraction is different from the tenth embodiment of the present disclosure in that the protrusion 5 is provided at the magnetic pole surface 71 of the stationary core 7, and the recess 6 is provided at the magnetic pole surface 21 of the movable core 2.

In addition, the present disclosure also provides a direct-acting magnetic circuit system and a high-voltage DC relay. The improvement of the structure can improve the initial electromagnetic attraction under the same volume and power consumption of the coil: or reduce the volume and power consumption of the coil under the achievement of the initial electromagnetic attraction at the same level.

The technical solution of the present disclosure provides a direct-acting magnetic circuit system, which includes a coil, a movable magnetizer and a stationary magnetizer. The coil, the movable magnetizer and the stationary magnetizer are respectively provided at adaptive positions, so that the magnetic pole surface of the movable magnetizer and the magnetic pole surface of the stationary magnetizer are in opposite positions with preset magnetic gaps, and the movable magnetizer is attracted to the stationary magnetizer when the coil is energized. One of the two magnetic pole surfaces is provided with a protrusion protruding to the other magnetic pole surface, and in the other magnetic pole surface, a recess into which the protrusion is embedded is provided at a position corresponding to the protrusion, and a recessed depth of the recess is not less than the protruding height of the protrusion.

According to an embodiment of the present disclosure, in a state that the coil is not energized, the protruding height of the protrusion is smaller than the preset magnetic gap between the two magnetic pole surfaces.

According to an embodiment of the present disclosure, in a state that the protrusion is fully embedded in the recess, the gaps between the side faces of the protrusion and the corresponding side walls of the recess are completely the same.

According to an embodiment of the present disclosure, in a state that the protrusion is fully embedded in the recess, the gap between the side face of the protrusion and the side wall of the recess is not smaller than the distance between the top face of the protrusion and the bottom face of the recess, and a distance between the top face of the protrusion and the bottom face of the recess is not smaller than the distance between two magnetic pole surfaces.

According to an embodiment of the present disclosure, the top face of the protrusion is a plane, and a distance from the side edge of the top face of the protrusion to a side edge of the recess corresponding to a notch is smaller than a preset magnetic gap between the two magnetic pole surfaces.

According to an embodiment of the present disclosure, the side face of the protrusion is one or a combination of more than two of a vertical surface, an inclined surface and a curved surface.

According to an embodiment of the present disclosure, there are one or more protrusions and one or more recesses at corresponding positions.

According to an embodiment of the present disclosure, the protrusion is a separate part, and the protrusion is fixed on the magnetic pole surface.

According to an embodiment of the present disclosure, the protrusion is an integral structure formed on the magnetic pole surface.

According to an embodiment of the present disclosure, the protrusion is in a shape of a protruding shaft.

According to an embodiment of the present disclosure, the protrusion is strip-shaped.

According to an embodiment of the present disclosure, the protrusion is in a shape of a straight line, an arc or a circular ring.

According to an embodiment of the present disclosure, a sum of areas of the top faces of all the protrusions of the magnetic pole surface is smaller than a remaining area of the magnetic pole surface from which all the protrusions are removed.

According to an embodiment of the present disclosure, one of the magnetic pole surfaces is provided in the movable magnetizer, and the other magnetic pole surface is provided in the stationary magnetizer; and the movable magnetizer is a movable core.

The stationary magnetizer is a stationary core or a yoke plate.

According to another aspect of the present disclosure, a high-voltage DC relay includes a direct-acting magnetic circuit system.

Compared with the prior art, the present disclosure has beneficial effects:

In the present disclosure, one of the two magnetic pole surfaces is provided with the protrusion protruding to the other magnetic pole surface, and in the other magnetic pole surface, the recess into which the protrusion is embedded is provided at the position corresponding to the protrusion, and the recessed depth of the recess is not less than the protruding height of the protrusion: in the state that the coil is not energized, the protruding height of the protrusion is smaller than the preset magnetic gap between the two magnetic pole surfaces. According to this structure of the present disclosure, the protrusion of one of the two magnetic pole surfaces is employed to reduce the magnetic gap between the two magnetic pole surfaces at the protrusion, so as to reduce the magnetic resistance and increase the initial electromagnetic attraction, or reduce the volume and power consumption of the coil under the same initial electromagnetic attraction. According to the present disclosure, the recess of the other magnetic pole surface is matched with the protrusion of one magnetic pole surface, so that it is ensured that the two magnetic pole surfaces can be fully attracted to each other.

FIGS. 1 to 22 as employed in the aforementioned embodiments of the magnetic circuit system with enhanced initial electromagnetic attraction may still be employed to show the direct-acting magnetic circuit system of the present disclosure. For brief description, the direct-acting magnetic circuit system and the high-voltage DC relay of the present disclosure will be further described in detail with reference to FIGS. 1 to 22, but the direct-acting magnetic circuit system and the high-voltage DC relay of the present disclosure are not limited to the embodiments.

The First Embodiment of Direct-acting Magnetic circuit system.

Referring to FIGS. 1 to 6, the direct-acting magnetic circuit system of the present disclosure includes a coil 1, a movable magnetizer 2, and a stationary magnetizer 3. The coil 1, the movable magnetizer 2 and the stationary magnetizer 3 are respectively provided in adaptive positions, so that a magnetic pole surface 21 of the movable magnetizer 2 and a magnetic pole surface 31 of the stationary magnetizer 3 are in opposite positions with a preset magnetic gap, and the movable magnetizer 2 is attracted to the stationary magnetizer 3 when the coil 1 is energized: In this embodiment, the movable magnetizer 2 is a movable core, and the stationary magnetizer 3 is a yoke plate. The magnetic circuit system further includes a spring 41, a magnetic sleeve 42 and a U-shaped yoke 43, wherein the coil 1 is fitted into a U-shaped opening of the U-shaped yoke 43, and the magnetic sleeve 42 is fitted in a middle through hole of the coil 1, and a bottom end of the magnetic sleeve 42 is connected with the U-shaped yoke 43. The movable core 2 is movably fitted in the middle through hole of the coil 1 and the middle through hole of the magnetic sleeve 42. An upper end face of the movable core 2 is set as a magnetic pole surface 21. The yoke plate 3 is installed at an upper end of the U-shaped yoke 43, above the coil 1 and the movable core 2. The spring 41 is installed between the movable core 2 and the yoke plate 3 to realize the resetting of the movable core. A lower end face of the yoke plate 3 is set as a magnetic pole surface 31, and the movable core 2 moves upward to attract the yoke plate 3 when the coil 1 is energized: In this embodiment, one of the two magnetic pole surfaces, i.e., the magnetic pole surface 21 of the movable core 2 is provided with a protrusion 5 protruding to the other magnetic pole surface, i.e., the magnetic pole surface 31 of the yoke plate 3. In the magnetic pole surface 31 of the yoke plate 3, a recess 6 into which the protrusion 5 is embedded is provided at a position corresponding to the protrusion 5, and a recessed depth of the recess 6 of the magnetic pole surface 31 of the yoke plate 3 is not less than a protruding height of the protrusion 21 of the movable core 2. In the case that the coil 1 is not energized, the protruding height of the protrusion 5 of the magnetic pole surface 21 of the movable core 2 is smaller than a preset magnetic gap between the two magnetic pole surfaces 21 and 31.

In this embodiment, in a state that the protrusion 5 is fully embedded in the recess 6, the gaps between all the side faces 52 of the protrusion 5 and the corresponding side walls 61 of the recess 6 are completely the same.

In this embodiment, in the state that the protrusion 5 is fully embedded in the recess 6, the gap between the side face 52 of the protrusion 5 and the side wall 61 of the recess 6 is not less than the distance between the top face 51 of the protrusion 5 and the bottom face 62 of the recess 6, and the distance between the top face 51 of the protrusion 5 and the bottom face 62 of the recess 6 is not less than the distance between the two magnetic pole surfaces 21 and 31.

In this embodiment, the top face 51 of the protrusion 5 is a plane, and the distance between a side edge of the top face 51 of the protrusion 5 and a side edge of the of the recess 6 corresponding to a notch is smaller than the preset magnetic gap between the two magnetic pole surfaces 21 and 31.

In this embodiment, one protrusion 5 is provided on the magnetic pole surface 21 of the movable core 2, and correspondingly, one recess 6 is provided on the magnetic pole surface 31 of the yoke plate 3.

In this embodiment, the protrusion 5 of the magnetic pole surface 21 of the movable core 2 is an integral structure formed on the magnetic pole surface 21 of the movable core 2.

In this embodiment, the protrusion 5 on the magnetic pole surface 21 of the movable core 2 is in a strip shape.

In this embodiment, the protrusion 5 on the magnetic pole surface 21 of the movable core 2 is annular.

In this embodiment, both side faces of the protrusion 5 of the magnetic pole surface 21 of the movable core 2 are vertical surfaces.

As shown in FIG. 3 and FIG. 5, in this embodiment, a top face 51 of the protrusion 5 is a plane, and in the case that the protrusion 5 is fully embedded in the recess 6, the gaps between the side faces 52 of the protrusion 5 and the side walls 61 of the recess 6 are completely identical, so that when the coil 1 is energized, a resultant force direction of the force generated between the protrusion 5 and the recess 6 when the coil is energized is always along the direction where the movable core 2 moves to the yoke plate 3.

In this embodiment, an area of the top face of the protrusion 5 of the magnetic pole surface 21 of the movable core 2 is smaller than a remaining area, and the remaining area refers to that an area of the magnetic pole surface 21 of the movable core 2 reduces the area of the protrusion 5.

As shown in FIG. 3, when the coil 1 is just energized, an attractive force may be generated between the movable core 2 and the yoke plate 3, and includes attractive forces F1 and F2 between two sides of the protrusion 5 of the movable core 2 and the two corresponding sides of the recess 6 of the yoke plate 3, an attractive force F5 between the top face 51 of the protrusion of the movable core 2 and the bottom face 62 of the recess 6 of the yoke plate 3, and attractive forces F3 and F4 between the magnetic pole surfaces 21, 31 on both sides of the protrusion 5.

When the coil 1 is just energized, gaps at the attractive forces F1 and F2 are smaller than gags at the attractive forces F3, F4 and F5, the attractive forces F1 and F2 are greater, and the gap at the attractive force F1 is equal to the gap at the attractive force F2. The resultant force of the attractive forces F1 and F2 is along a direction where the movable core 2 moves to the yoke plate 3. Due to the attractive forces F1 and F2, the initial electromagnetic attraction can be enhanced. During the process from the activation to the full attraction between the magnetic pole surface 21 of the movable core 2 and the magnetic pole surface 31 of the yoke plate 3, the attractive forces F1, F2 are simultaneously attracted, the gaps at the attractive forces F1, F2 remain the same, and the attractive forces are symmetrical, and the resultant force is still in the direction where the movable core 2 is attracted to the yoke plate 3, and as the gaps at the attractive forces F3, F4 and F5 become smaller, the attractive forces F3, F4 and F5 gradually increase and become dominant: after the magnetic pole surface 21 of the movable core 2 and the magnetic pole surface 31 of the yoke plate 3 are fully attracted and maintained in position, as shown in FIG. 5, the attractive forces F3, F4, F5 reach the maximum values, and the attractive forces F1, F2 are smaller, the resultant force of the attractive forces F1, F2 are still in the direction where the movable core 2 is attracted to the yoke plate 3.

The high-voltage DC relay of the present disclosure includes a direct-acting magnetic circuit system.

According to the direct-acting magnetic circuit system and the high-voltage DC relay of the present disclosure, the magnetic pole surface 21 of the movable core 2 is provided with a protrusion 5 protruding to the magnetic pole surface 31 of the yoke plate 3, and the magnetic pole surface 31 of the yoke plate 3 is provided with a recess 6 corresponding to the protrusion 5, into which the protrusion 5 of the magnetic pole surface 21 of the movable core 2 is embedded when the movable core 2 is attracted to the yoke plate 3. With this structure of the present disclosure, the protrusion 5 of the magnetic pole surface 21 of the movable core 2 is employed to reduce the magnetic gap between the two magnetic pole surfaces 21 and 31 at the protrusion, to reduce the magnetic resistance and increase the initial electromagnetic attraction, or to reduce the volume and power consumption of the coil under the same initial electromagnetic attraction. In the present disclosure, the recess 6 of the magnetic pole surface 31 of the yoke plate 3 is matched with the protrusion 5 of the magnetic pole surface 21 of the movable core 2, so that full attraction of the two magnetic pole surfaces 21 and 31 can be ensured.

The Second Embodiment of Direct-acting Magnetic circuit system.

Referring to FIG. 8, the direct-acting magnetic circuit system and the high-voltage DC relay of the present disclosure are different from that of the first embodiment in that the protrusion 5 is a separate part, and the protrusion 5 is fixed on the magnetic pole surface 21 of the movable core 2.

The Third Embodiment of Direct-acting Magnetic circuit system.

Referring to FIG. 9, the direct-acting magnetic circuit system and the high-voltage DC relay of the present disclosure are different from that of the first embodiment in that the protrusion 5 is in the shape of a protruding shaft.

The protrusion 5 in the shape of the protruding shaft may also be a separate part, and the protrusion 5 in the shape of the protruding shaft is fixed on the magnetic pole surface 21 of the movable core 2.

The Fourth Embodiment of Direct-acting Magnetic circuit system.

Referring to FIG. 10, the direct-acting magnetic circuit system and the high-voltage DC relay of the present disclosure are different from that of the third embodiment in that there are two protrusions 5 in the shape of protruding shafts.

The Fifth Embodiment of Direct-acting Magnetic circuit system.

As shown in FIG. 11 and FIG. 12, the direct-acting magnetic circuit system and the high-voltage DC relay of the present disclosure are different from that of the first embodiment in that there are two annular protrusions 5 and two corresponding recesses 6 on the magnetic pole surface 31 of the yoke plate 3.

The two annular protrusions 5 may also be separate parts, and the two protrusions 5 are fixed on the magnetic pole surface 21 of the movable core 2.

The Sixth Embodiment of Direct-acting Magnetic circuit system.

Referring to FIG. 13, the direct-acting magnetic circuit system and the high-voltage DC relay of the present disclosure are different from that of the first embodiment in that strip-shaped protrusions 5 are arc-shaped, and there are two arc-shaped protrusions 5, and two corresponding shape-matched recesses 6 of the magnetic pole surface 31 of the yoke plate 3.

The two arc-shaped protrusions 5 may also be separate parts, and the two protrusions 5 are fixed on the magnetic pole surface 21 of the movable core 2.

The Seventh Embodiment of Direct-acting Magnetic circuit system.

Referring to FIG. 11, the direct-acting magnetic circuit system and the high-voltage DC relay of the present disclosure are different from that of the first embodiment in that both side faces 52 of the protrusion 5 of the movable core 2 are inclined surfaces.

The Eight Embodiment of Direct-acting Magnetic circuit system.

Referring to FIG. 15, the direct-acting magnetic circuit system and the high-voltage DC relay of the present disclosure are different from that of the sixth embodiment in that the strip-shaped protrusion 5 is in a shape of straight line.

The Ninth Embodiment of Direct-acting Magnetic circuit system.

Figure 22:
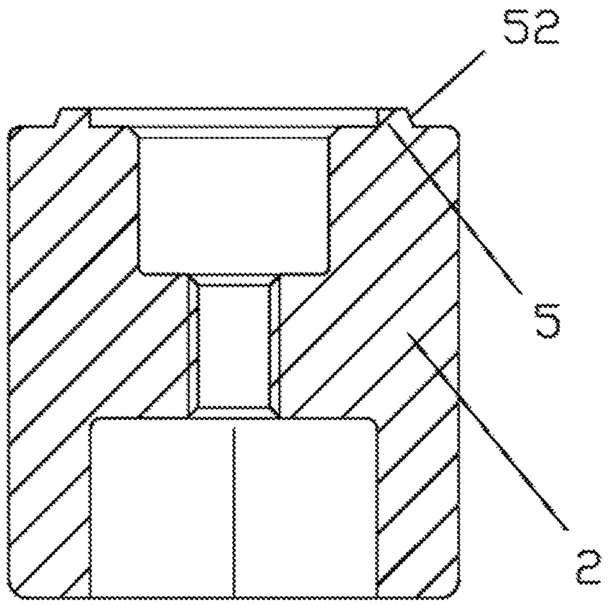
FIG. 22 is a cross-sectional view of a movable core in an embodiment of a direct-acting magnetic circuit system of the present disclosure.

Referring to FIG. 22, the direct-acting magnetic circuit system and the high-voltage DC relay of the present disclosure are different from that of the first embodiment in that one side face 52 of the protrusion 5 of the movable core 2 is an inclined surface.

The Tenth Embodiment of Direct-acting Magnetic circuit system.

Figure 23:
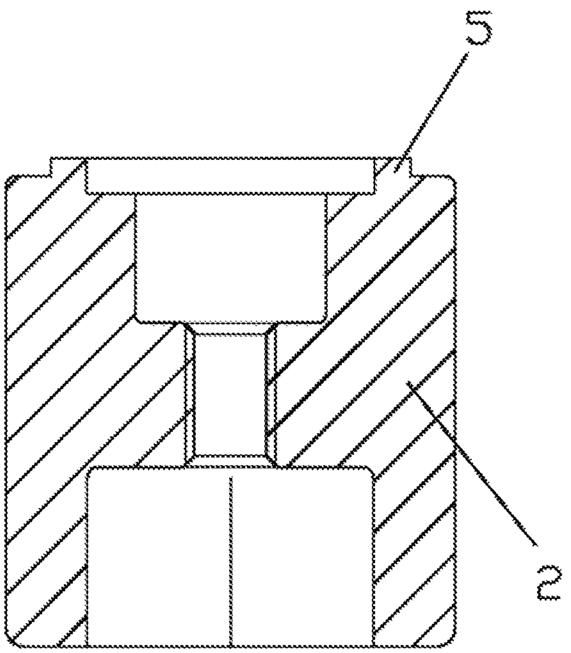
FIG. 23 is a sectional view of a movable core in another embodiment of the direct-acting magnetic circuit system of the present disclosure.
Figure 24:
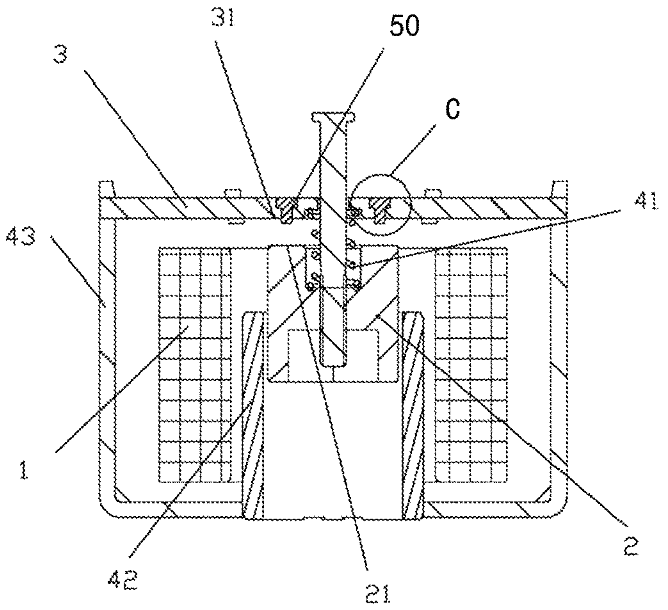
FIG. 24 is a cross-sectional view of the first embodiment of the magnetic circuit system capable of improving the initial electromagnetic attraction according to the present disclosure.
Figure 25:
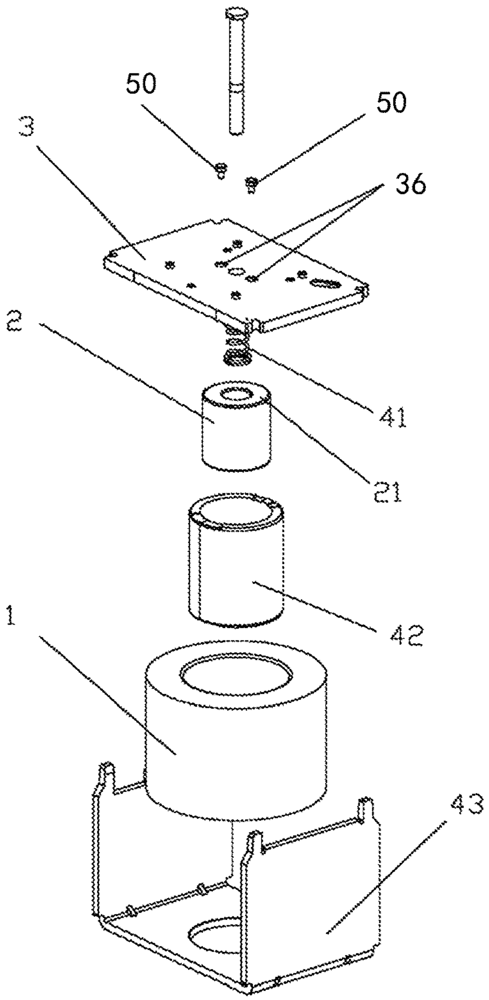
FIG. 25 is a perspective exploded view of the magnetic circuit system shown in FIG. 24.
Figure 26:
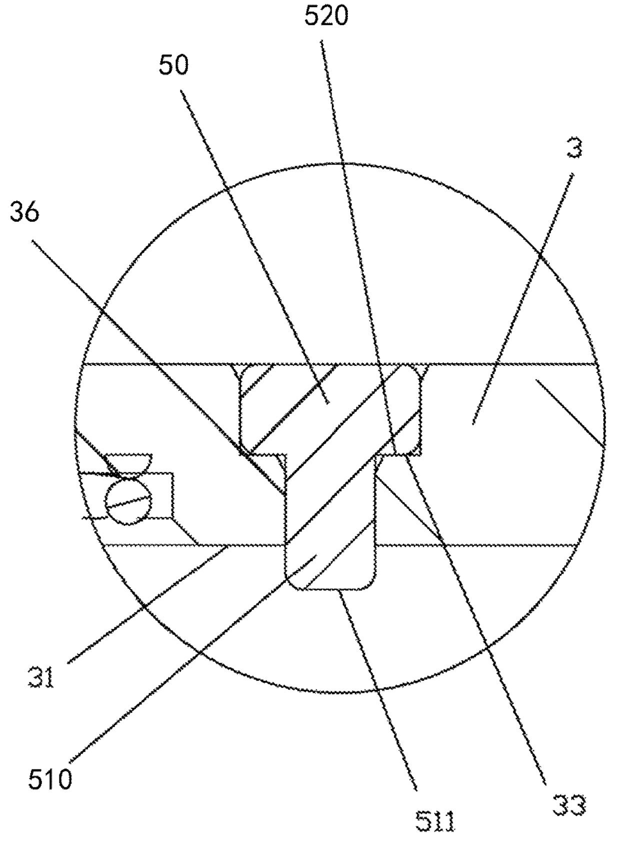
FIG. 26 is an enlarged schematic view of part C in FIG. 24.

Referring to FIG. 23, the direct-acting magnetic circuit system and the high-voltage DC relay of the present disclosure are different from that of the first embodiment in that height positions of roots on both sides of the protrusion 5 of the movable core 2 are uneven.

The Eleventh Embodiment of Direct-acting Magnetic circuit system.

Referring to FIGS. 16 and 17, the direct-acting magnetic circuit system and the high-voltage DC relay of the present disclosure are different from that of the first embodiment in that the protrusion 5 is provided at the magnetic pole surface 31 of the yoke plate 3, and the recess 6 is provided at the magnetic pole surface 21 of the movable core 2.

The Twelfth Embodiment of Direct-acting Magnetic circuit system.

Referring to FIGS. 18 and 19, the direct-acting magnetic circuit system and the high-voltage DC relay of the present disclosure are different from that of the first embodiment in that two stationary magnetizers are included, in addition to the yoke plate 3, a stationary core 7 is provided and assembled with the yoke plate 3 together, and a lower end face of the stationary core 7 is matched with the magnetic pole surface 21 of the movable core 2, that is, the lower end face of the stationary core 7 is set as the magnetic pole surface 71 matched with the magnetic pole surface 21 of the movable core 2. Therefore, in this embodiment, the recess is provided at the magnetic pole surface 71 of the stationary core 7.

The Thirteenth Embodiment of Direct-acting Magnetic circuit system.

Referring to FIGS. 20 and 21, the direct-acting magnetic circuit system and the high-voltage DC relay of the present disclosure are different from that of the twelfth embodiment in that the protrusion 5 is provided at the magnetic pole surface 71 of the stationary core 7, and the recess 6 is provided at the magnetic pole surface 21 of the movable core 2.

In addition, the present disclosure also provides a magnetic circuit system capable of improving the initial electromagnetic attraction and a high-voltage DC relay. The improvement of the structure can improve the initial electromagnetic attraction under the same volume and power consumption of the coil: or reduce the volume and power consumption of the coil under the achievement of the initial electromagnetic attraction at the same level.

The technical solution of the present disclosure provides a magnetic circuit system capable of improving the initial electromagnetic attraction, which includes a coil, a movable magnetizer and a stationary magnetizer. The coil, the movable magnetizer and the stationary magnetizer are respectively provided at adaptive positions, so that the magnetic pole surface of the movable magnetizer and the magnetic pole surface of the stationary magnetizer are in opposite positions with preset magnetic gaps, and the movable magnetizer is attracted to the stationary magnetizer when the coil is energized. The magnetic circuit system further includes a protrusion that is slidably fitted at a position of one of the movable magnetizer and the stationary magnetizer corresponding to the magnetic pole surface, and protrudes from the magnetic pole surface of one of the movable magnetizer and the stationary magnetizer to the magnetic pole surface of the other one thereof when the movable magnetizer is not moved, so that the magnetic gap between the magnetic pole surfaces of the movable magnetizer and the stationary magnetizer becomes smaller at the protrusion, thereby reducing the magnetic resistance and improving the initial electromagnetic attractive force. After the movable magnetizer moves to make the protrusion of one of the movable magnetizer and the stationary magnetizer abut against the magnetic pole surface of the other one thereof, the protrusion moves in a direction opposite to the protruding, thus ensuring the full attraction of the magnetic pole surfaces of the movable magnetizer and the stationary magnetizer.

According to an embodiment of the present disclosure, the protrusion is a block structure with a protruding portion, and a slot is provided at a position of one of the movable magnetizer and the stationary magnetizer corresponding to the magnetic pole surface. The protrusion with the block structure is slidably fitted in the slot of one of the movable magnetizer and the stationary magnetizer, and the protruding portion of the protrusion protrudes in a direction from the magnetic pole surface of one of the movable magnetizer and the stationary magnetizer to the magnetic pole surface of the other one thereof.

According to an embodiment of the present disclosure, first step structures matched with each other are provided between the block structure with the protruding portion and the slot, and the first step structures restrict the movement of the protruding portion of the protrusion to the magnetic pole surface of the other one thereof, so as to ensure that there is a certain gap between the protruding portion of the protrusion of one of the movable magnetizer and the stationary magnetizer and the magnetic pole surface of the other one thereof when the movable magnetizer is not moved.

According to an embodiment of the present disclosure, there are one or more than two block structures with the protruding portion, and correspondingly, there are one or more than two slots of one of the movable magnetizer and the stationary magnetizer.

According to an embodiment of the present disclosure, the protrusion is a ring, and the annular piece is slidably fitted on an outer periphery of one of the movable magnetizer and the stationary magnetizer, and one end of the annular piece protrudes from the magnetic pole surface of one of the movable magnetizer and the stationary magnetizer to the magnetic pole surface of the other one thereof.

According to an embodiment of the present disclosure, a protruding edge structure is provided between the other end of the annular piece and the outer periphery of one of the two parts, namely the movable magnetizer and the stationary magnetizer, and the protruding edge structure restricts one end of the annular piece from moving in the direction of the magnetic pole surface of the other part, so as to ensure a certain gap between one end of the annular piece and the magnetic pole surface of the other part when the movable magnetizer is not moved.

According to an embodiment of the present disclosure, the protrusion is slidably fitted on the movable magnetizer, and the movable magnetizer is a movable core.

According to an embodiment of the present disclosure, the protrusion is slidably fitted on the stationary magnetizer, and the stationary magnetizer is a yoke plate or a stationary core.

According to another aspect of the present disclosure, a high-voltage DC relay includes the above-mentioned magnetic circuit system capable of improving the initial electromagnetic attraction.

Compared with the prior art, the magnetic circuit system capable of improving the initial electromagnetic attraction and the high-voltage DC relay have beneficial effects as follows:

The magnetic circuit system of the present disclosure is provided with the protrusion, and the protrusion is slidably fitted at the position one of the movable magnetizer and the stationary magnetizer corresponding to the magnetic pole surface, and when the movable magnetizer is not moved, the protrusion protrudes from the magnetic pole surface of one of the movable magnetizer and the stationary magnetizer to the magnetic pole surface of the other one thereof, and after the movable magnetizer moves such that the protrusion of one of the movable magnetizer and the stationary magnetizer abuts against the magnetic pole surface of the other one thereof, the protrusion moves in a direction opposite to the protruding. With this structure of the present disclosure, on the first aspect, the protrusion protrudes from the magnetic pole surface of one of the movable magnetizer and the stationary magnetizer to the magnetic pole surface of the other one thereof, so that the magnetic gap between the magnetic pole surfaces of the movable magnetizer and the stationary magnetizer becomes smaller at the protrusion, thereby reducing the magnetic resistance and improving the initial electromagnetic attraction, or reducing the volume and power consumption of the coil under the same initial electromagnetic attraction: according to the present disclosure, the protrusion is movable in the direction opposite to the protrusion to ensure full attraction between the magnetic pole surfaces of the movable magnetizer and the stationary magnetizer. On the second aspect, it is not required to set an aside space during the attraction of the movable magnetizer and the stationary magnetizer, and the protrusion may be provided in a direction of the gap between the movable magnetizer and the stationary magnetizer to generate the attractive force between the movable magnetizer and the stationary magnetizer. On the third aspect, according to the match between the attraction force and the reaction force, in the case that a protruding height of the protrusion is to be designed, as the protrusion is movable, it is unnecessary to replace the movable magnetizer (i.e., the movable core) or the stationary magnetizer (i.e., the stationary core or the yoke plate) at a design stage, and thereby reducing the design cost and process.

The magnetic circuit system capable of improving the initial electromagnetic attraction and the high-voltage DC relay of the present disclosure will be further described in detail in conjunction with the drawings and embodiments.

The First Embodiment of Magnetic circuit system Capable of Improving Initial Electromagnetic Attraction.

Referring to FIG. 24 to FIG. 27, the magnetic circuit system capable of improving the initial electromagnetic attraction of the present disclosure includes a coil 1, a movable magnetizer 2, and a stationary magnetizer 3. The coil 1, the movable magnetizer 2 and the stationary magnetizer 3 are respectively provided in adaptive positions, so that a magnetic pole surface 21 of the movable magnetizer 2 and a magnetic pole surface 31 of the stationary magnetizer 3 are in opposite positions with a preset magnetic gap, and the movable magnetizer 2 is attracted to the stationary magnetizer 3 when the coil 1 is energized: In this embodiment, the movable magnetizer 2 is a movable core, and the stationary magnetizer 3 is a yoke plate. The magnetic circuit system further includes a spring 41, a magnetic sleeve 42 and a U-shaped yoke 43, wherein the coil 1 is fitted into a U-shaped opening of the U-shaped yoke 43, and the magnetic sleeve 42 is fitted in a middle through hole of the coil 1, and a bottom end of the magnetic sleeve 42 is connected with the U-shaped yoke 43. The movable core 2 is movably fitted in the middle through hole of the coil 1 and the middle through hole of the magnetic sleeve 42. An upper end face of the movable core 2 is set as a magnetic pole surface 21. The yoke plate 3 is installed at an upper end of the U-shaped yoke 43, above the coil 1 and the movable core 2. The spring 41 is installed between the movable core 2 and the yoke plate 3 to realize the resetting of the movable core. A lower end face of the yoke plate 3 is set as a magnetic pole surface

31, and the movable core 2 moves upward to attract the yoke plate 3 when the coil 1 is energized. The magnetic circuit system further includes a protrusion 50 that is slidably fitted at the position one of the movable magnetizer and the stationary magnetizer corresponding to the magnetic pole surface. In this embodiment, one of the movable magnetizer and the stationary magnetizer is the stationary magnetizer. i.e., the yoke plate 3, and the other one of the movable magnetizer and the stationary magnetizer is the movable core 2. The protrusion 50 is slidably fitted at the position of the yoke plate 3 corresponding to the magnetic pole surface 31, and the protrusion protrudes from the magnetic pole surface 31 of the yoke plate 3 to the magnetic pole surface 21 of the yoke plate 2 when the movable core 2 does not move upward, so that the magnetic gap between the magnetic pole surface 21 of the movable core 2 and the magnetic pole surface 31 of the yoke plate 3 becomes smaller at the protrusion 50, thereby reducing the magnetic resistance and improving the initial electromagnetic attraction. After the movable core 2 moves so that the protrusion 50 of the yoke plate 3 abuts against the magnetic pole surface 21 of the movable core 2, the protrusion 50 moves in the direction opposite to the protrusion, so as to ensure the full attraction between the magnetic pole surface 21 of the movable core 2 and the magnetic pole surface 31 of the yoke plate 3.

In this embodiment, the protrusion 50 is a block structure with a protruding portion 510, and a slot 36 is provided at the position of the yoke plate 3 corresponding to the magnetic pole surface 31: the protrusion 50 of the block structure is slidably fitted in the slot 36 of the yoke plate 3, and the protruding portion 510 of the protrusion 50 protrudes from the magnetic pole surface 31 of the yoke plate 3 to the magnetic pole surface 21 of the movable core 2, and a top face 511 of the protrusion 50 is a plane.

In this embodiment, first step structures that are cooperated with each other are provided between the block structure 5 with the protruding portion 510 and the slot 36 of the yoke plate 3, and the first step structures include a step 520 provided in the protrusion 50 and a step 33 provided in the slot 36 of the yoke plate 3. The cooperation between the step 520 of the protrusion 50 and the step 33 of the yoke plate 3 restricts the protruding portion 510 of the protrusion 50 from moving to the magnetic pole surface 21 of the movable core 2, so as to ensure a certain gap between the protruding portion 510 of the protrusion 50 and the magnetic pole surface 21 of the movable core 2 in the case that the movable core 2 does not move. That is to say, a size of the protrusion 50 that protrudes out of the magnetic pole surface 31 of the yoke plate 3 is smaller than the preset magnetic gap between the magnetic pole surface 21 of the movable core 2 and the magnetic pole surface 31 of the yoke plate 3.

In this embodiment, there are two block structures 5 with protruding portions 510, and correspondingly there are also two slots 36 of the yoke plate 3.

The high-voltage DC relay of the present disclosure includes the magnetic circuit system capable of improving the initial electromagnetic attraction.

Figure 4:
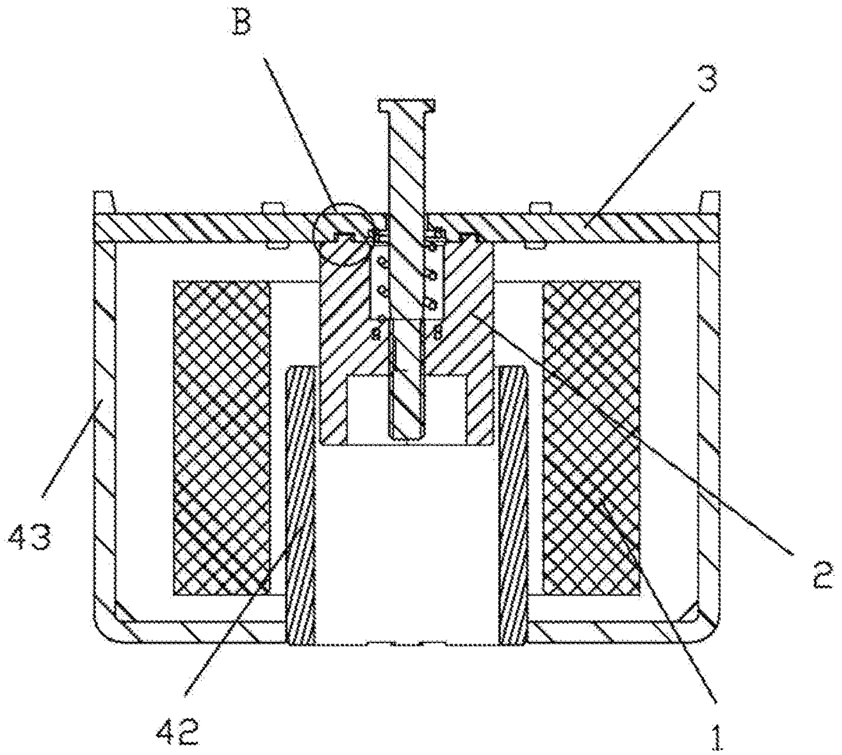
FIG. 4 is a cross-sectional view of the magnetic circuit system shown in FIG. 1 in a state that a movable core moves to a position after the coil is energized.
Figure 27:
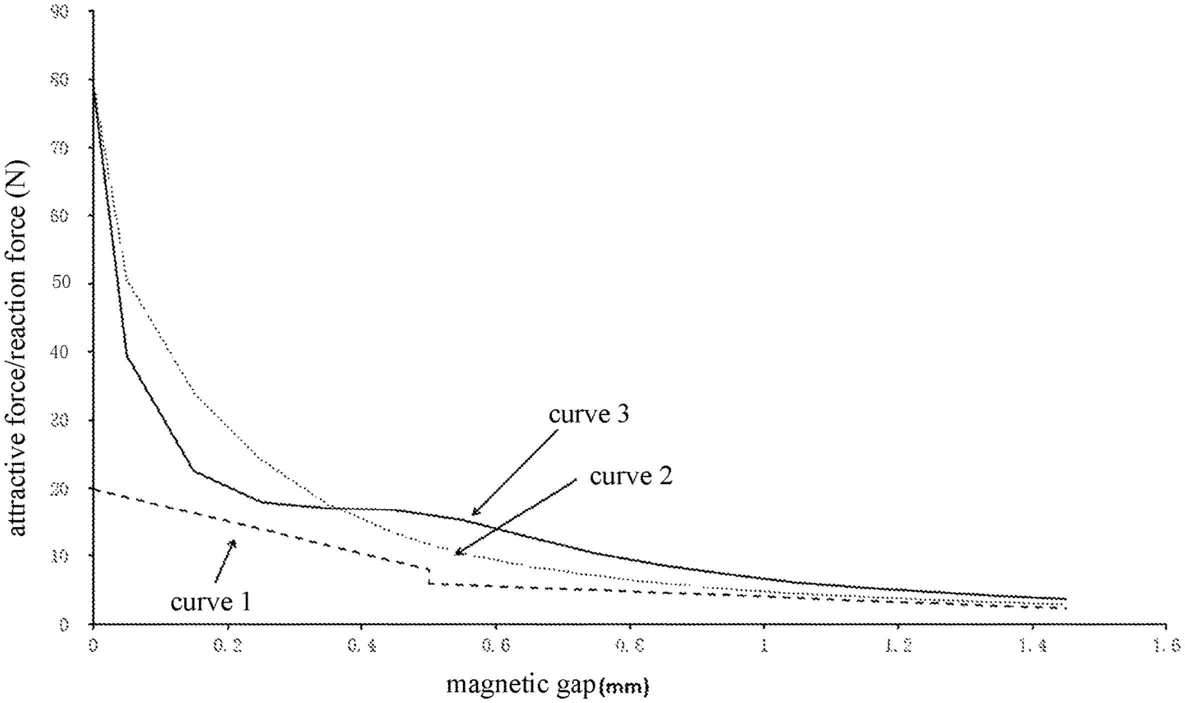
FIG. 27 is a schematic view of corresponding relationship between the magnetic gap of the magnetic circuit system shown in FIG. 24 and the attraction/reaction force.

Referring to FIG. 27, a magnetic circuit system capable of improving the initial electromagnetic attraction and a high-voltage DC relay of the present disclosure are shown. In the figures, a curve 1 is a reaction force curve of movement of a relay, a curve 2 is an attractive force curve of the relay in the prior art, and a curve 3 is an attractive force curve of the relay of the present disclosure. At the moment when the relay is activated, the magnetic gap is the largest, as shown in a right side of FIG. 4 (i.e., 1.45 mm). At this time, a driving voltage is given to the coil, assuming it is 7 V, an electromagnetic attraction (in the right side of the curve 2 as shown in FIG. 4) is generated in the prior art. According to the present disclosure, the movable core 2 is provided with the protrusion 5 to reduce the magnetic gap, reduce initial magnetic resistance, improve initial attractive force, and reduce power consumption for activation. At this time, the driving voltage is still 7V, greater electromagnetic attractive force is generated (as shown in the right side of the curve 3 in FIG. 4). As can be seen from FIG. 4, the curve 2 and the curve 3 intersect at a magnetic gap of 0.35 mm, and the electromagnetic attractive force of the present discloser is greater than the electromagnetic attractive force of the prior art at a magnetic gap of 1.45 mm to 0.35 mm. In the case that the electromagnetic attractive force is generated as same as that in the prior art, less driving voltage is needed, so that the power consumption for driving can be reduced. When the protrusion 50 is in contact with the magnetic pole surface 21 of the movable core 2, a lifting magnetic force of the protrusion 50 disappears, meanwhile the two magnetic pole surfaces 21, 31 are close, resulting in a strong electromagnetic force, the protrusion may be movable in an opposite direction, so that the protrusion 50 cannot block the continued movement of the magnetizer until the core is completely closed, that is, the magnetic pole surface 21 of the movable core 2 and the magnetic pole surface 31 of the yoke plate 3 are attracted together.

According to the magnetic circuit system capable of improving the initial electromagnetic attraction and the high-voltage DC relay of the present disclosure, the magnetic circuit system is provided with a protrusion 50, and the protrusion 50 is slidably fitted at the position of the yoke plate 3 corresponding to the magnetic pole surface 31, and the protrusion 50 protrudes from the magnetic pole surface 31 of the yoke plate 3 to the magnetic pole surface 21 of the movable core 2 in the state that the movable core 2 does not move, and after the movable core 2 moves such that the protrusion 50 of the yoke plate 3 abuts against the magnetic pole surface 21 of the movable core 2, the protrusion 50 moves in a direction opposite to the protrusion. With this structure of the present disclosure, on the first aspect, the protrusion protrudes from the magnetic pole surface of one of the movable magnetizer and the stationary magnetizer to the magnetic pole surface of the other one thereof, so that the magnetic gap between the magnetic pole surfaces of the movable magnetizer and the stationary magnetizer becomes smaller at the protrusion, thereby reducing the magnetic resistance and improving the initial electromagnetic attraction, or reducing the volume and power consumption of the coil under the same initial electromagnetic attraction: according to the present disclosure, the protrusion is movable in the direction opposite to the protrusion to ensure full attraction between the magnetic pole surfaces of the movable magnetizer and the stationary magnetizer. On the second aspect, it is not required to set an aside space during the attraction of the movable magnetizer and the stationary magnetizer, and the protrusion may be provided in a direction of the gap between the movable magnetizer and the stationary magnetizer to generate the attractive force between the movable magnetizer and the stationary magnetizer. On the third aspect, according to the match between the attraction force and the reaction force, in the case that a protruding height of the protrusion is to be designed, as the protrusion is movable, it is unnecessary to replace the movable magnetizer (i.e., the movable core) or the stationary magnetizer (i.e., the stationary core or the yoke plate) at a design stage, and thereby reducing the design cost and process.

The Second Embodiment of Magnetic circuit system Capable of Improving Initial Electromagnetic Attraction.

Figure 28:
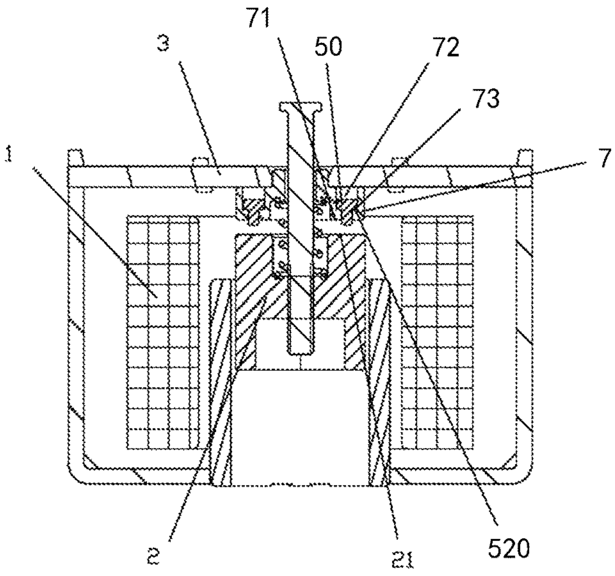
FIG. 28 is a cross-sectional view of the second embodiment of the magnetic circuit system capable of improving the initial electromagnetic attraction according to the present disclosure.
Figure 29:
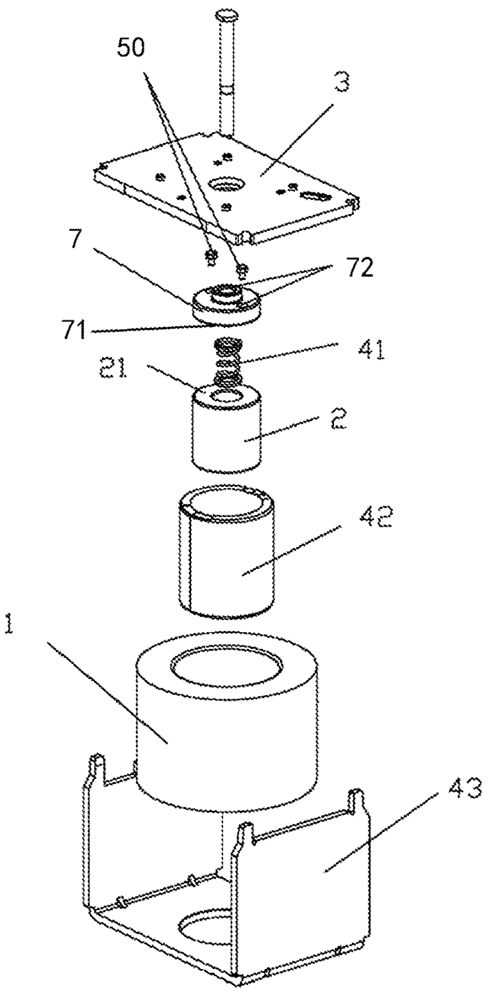
FIG. 29 is a perspective exploded view of the second embodiment of the magnetic circuit system shown in FIG. 28.

Referring to FIG. 28 to FIG. 29, the magnetic circuit system capable of improving the initial electromagnetic attraction and the high-voltage DC relay of the present disclosure are different from that of the first embodiment in that two stationary magnetizers are provided, in addition to the yoke plate 3, a stationary core 7 is also provided, and the stationary core 7 and the yoke plate 3 are assembled together, and a lower end face of the stationary core 7 is matched with the magnetic pole surface 21 of the movable core 2, that is, the magnetic pole surface 71, the lower end face of the stationary core 7 is set to match with the magnetic pole surface 21 of the movable core 2. Moreover, the protrusion 50 is slidably fitted at a position of the stationary core 7 corresponding to the magnetic pole surface 71, and the protrusion 50 is not installed at the yoke plate 3, and the stationary core 7 is provided with a slot 72 and a step 73, and the yoke plate 3 is not provided with a slot and a step, and the protrusion 50 is matched with the slot 72 of the stationary core 7, and the step 520 of the protrusion 50 is matched with the step 73 of the stationary core 7.

The Third Embodiment of Magnetic circuit system Capable of Improving Initial Electromagnetic Attraction.

Figure 30:
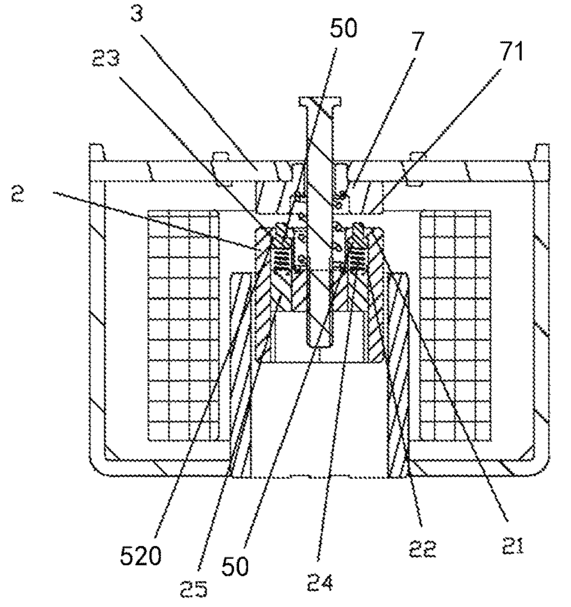
FIG. 30 is a cross-sectional view of the third embodiment of the magnetic circuit system capable of improving the initial electromagnetic attraction according to the present disclosure.
Figure 31:
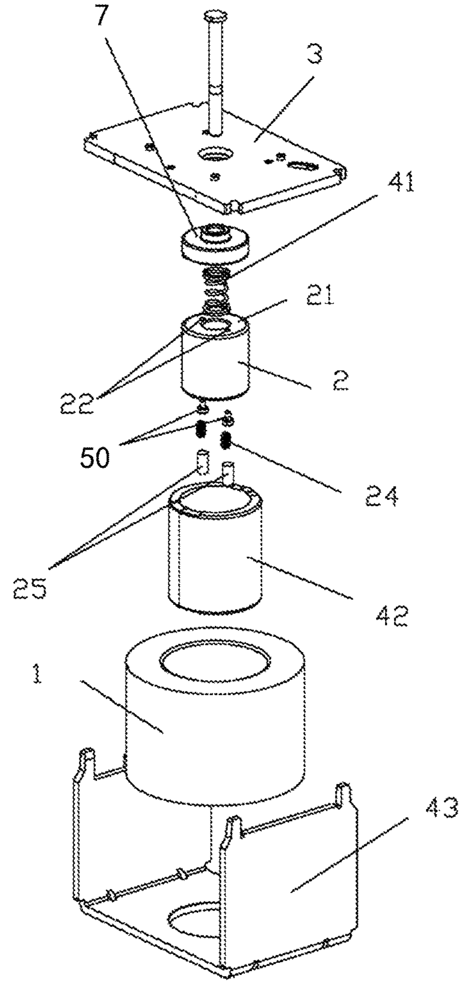
FIG. 31 is a perspective exploded view of the third embodiment of the magnetic circuit system shown in FIG. 30.

Referring to FIG. 30 to FIG. 31, the magnetic circuit system capable of improving the initial electromagnetic attraction and the high-voltage DC relay of the present disclosure are different from that of the second embodiment in that the protrusion 50 is slidably fitted at the position of the movable core 2 corresponding to the magnetic pole surface 21, instead of being mounted on the stationary core 7. The movable core 2 is provided with the slot 22 and the step 23, and the stationary core 7 is not provided with the slot and the step, and the protrusion 50 is matched with the slot 22 of the movable core 2, and the step 520 of the protrusion 50 is matched with the step 23 of the movable core 2.

In this embodiment, since the stationary core 7 is provided above the movable core 2, in order to prevent the protrusion 50 from falling freely in the slot 22 of the movable core 2, a support spring 24 is also installed at the bottom end of the protrusion 50, and a plug 25 for supporting the support spring 24 is also provided under the support spring 24.

The Fourth Embodiment of Magnetic circuit system Capable of Improving Initial Electromagnetic Attraction.

Figure 32:
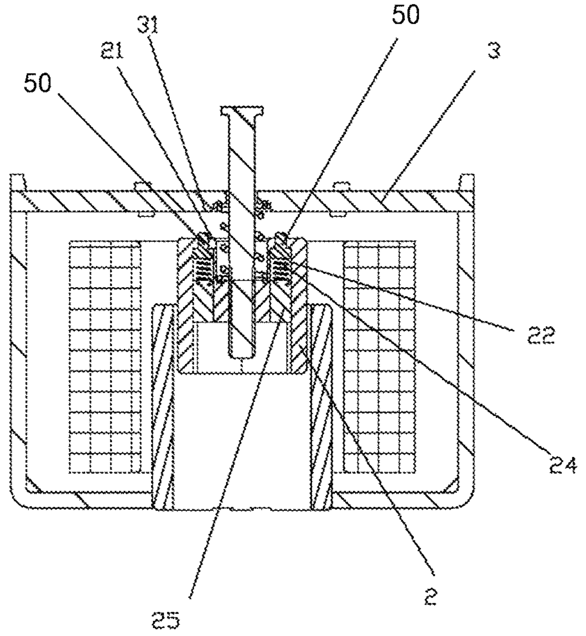
FIG. 32 is a cross-sectional view of the fourth embodiment of the magnetic circuit system capable of improving the initial electromagnetic attraction according to the present disclosure.
Figure 33:
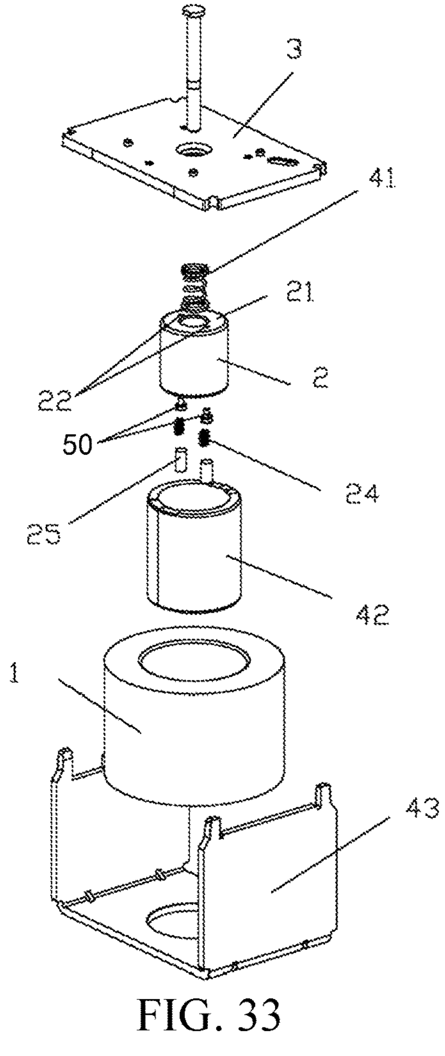
FIG. 33 is a perspective exploded view of the fourth embodiment of the magnetic circuit system shown in FIG. 32.

Referring to FIG. 32 to FIG. 33, the magnetic circuit system capable of improving the initial electromagnetic attraction and the high-voltage DC relay of the present disclosure are different from that of the first embodiment in that the protrusion 50 is slidably fitted at the position of the movable core 2 corresponding to the magnetic pole surface 21, instead of being mounted at the yoke plate 3. The movable core 2 is provided with the slot 22 and the step 23, and the yoke plate 3 is not provided with the slot and the step. The protrusion 50 is matched with the slot 22 of the movable core 2, and the step 520 of the protrusion 50 is matched with the step 23 of the movable core 2.

In this embodiment, since the yoke plate 3 is provided above the movable core 2, in order to prevent the protrusion 50 from falling freely in the slot 22 of the movable core 2, a support spring 24 is also installed at the bottom end of the protrusion 50, and a plug 25 for supporting the support spring 24 is also provided under the support spring 24.

The Fifth Embodiment of Magnetic circuit system Capable of Improving Initial Electromagnetic Attraction.

Figure 34:
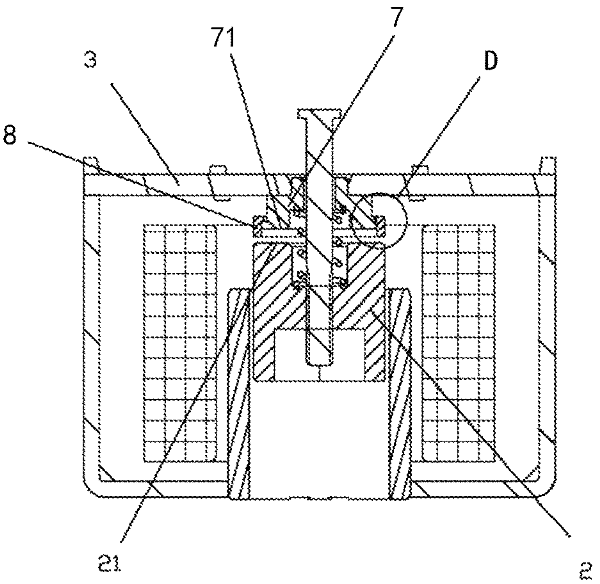
FIG. 34 is a cross-sectional view of the fifth embodiment of the magnetic circuit system capable of improving the initial electromagnetic attraction according to the present disclosure.
Figure 35:
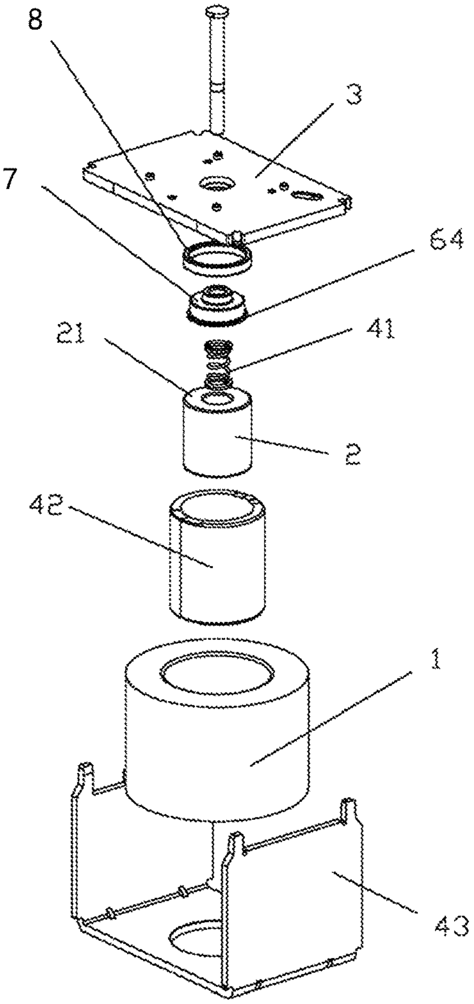
FIG. 35 is a perspective exploded view of the fifth embodiment of the magnetic circuit system shown in FIG. 34, which can improve the initial electromagnetic attraction.

Referring to FIG. 34 to FIG. 35, the magnetic circuit system capable of improving the initial electromagnetic attraction and the high-voltage DC relay of the present disclosure are different from that of the second embodiment in that the protrusion is not the block structure with the protruding portion, and the protrusion 50 is a ring, and the annular piece 8 is slidably fitted on the outer periphery of the stationary core 7, and one end 81 of the annular piece 8 protrudes from the magnetic pole surface 71 of the stationary core 7 to the magnetic pole surface 21 of the movable core 2. The stationary core 7 is not provided with the slot and the step, which are matched with the block structure with the protruding portion.

In this embodiment, protruding edge structures matched with each other are provided between the other end of the annular piece 8 and the outer periphery of the stationary core 7. The protruding edge structure includes an inner protruding edge 82 arranged at the other end of the annular piece 8 and an outer protruding edge 64 of the stationary core 7 close to the magnetic pole surface 71. Through the cooperation between the inner protruding edge 82 of the annular piece 8 and the outer protruding edge 64 of the stationary core 7, the protruding edge structure restricts the movement of one end 81 of the annular piece 8 toward the magnetic pole surface 21 of the movable core 2.

The Sixth Embodiment of Magnetic circuit system Capable of Improving Initial Electromagnetic Attraction.

Figure 36:
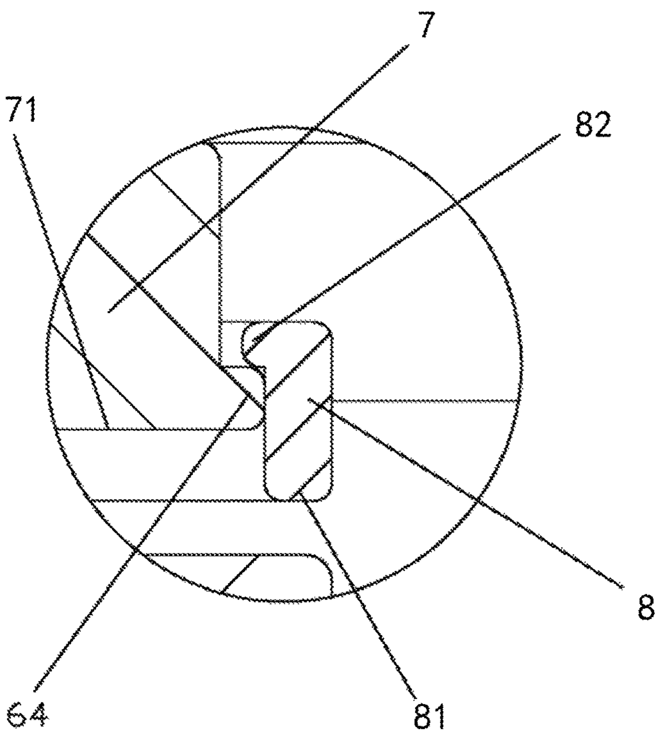
FIG. 36 is an enlarged schematic view of part D in FIG. 35.
Figure 37:
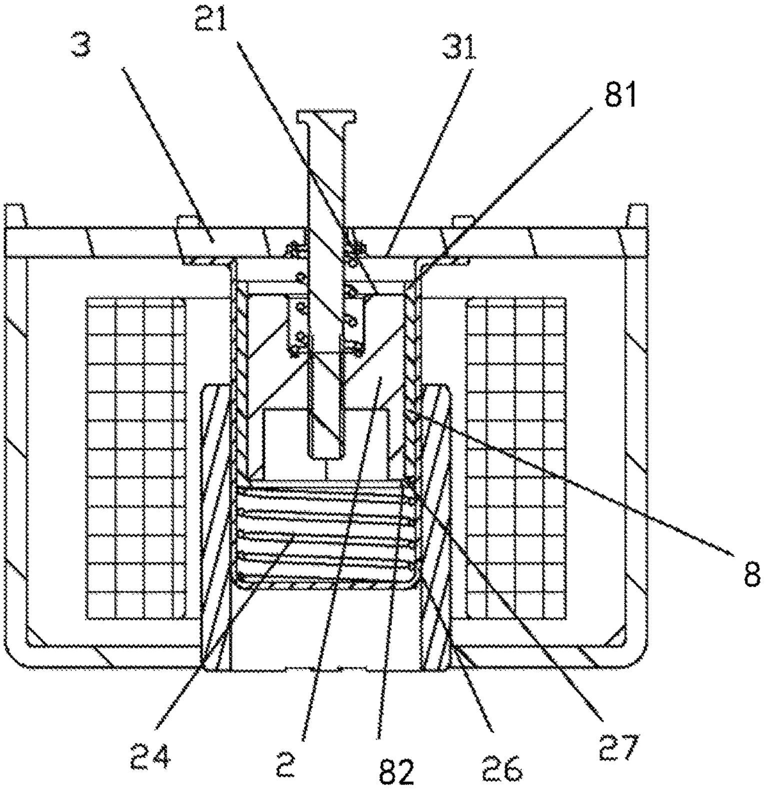
FIG. 37 is a cross-sectional view of the sixth embodiment of the magnetic circuit system capable of improving the initial electromagnetic attraction according to the present disclosure.
Figure 38:
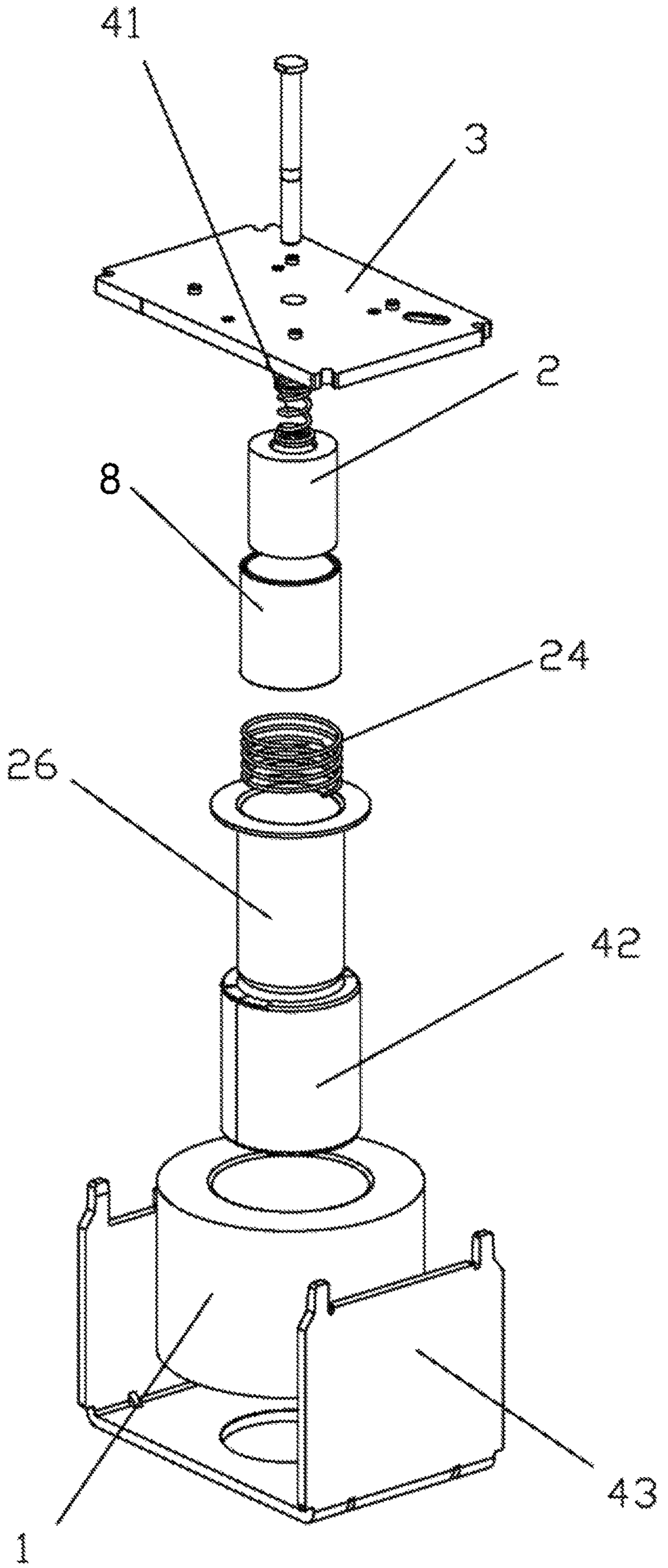
FIG. 38 is a perspective exploded view of the sixth embodiment of the magnetic circuit system shown in FIG. 37.

Referring to FIG. 36 to FIG. 37, the magnetic circuit system capable of improving the initial electromagnetic attraction and the high-voltage DC relay of the present disclosure are different from that of the first embodiment in that the protrusion is not the block structure with the protruding portion, and the protrusion 50 is a ring, and the annular piece 8 is slidably fitted on the outer periphery of the movable core 2, so that one end 81 of the annular piece 8 protrudes from the magnetic pole surface 21 of the movable core 2 to the magnetic pole surface 31 of the yoke plate 3. The yoke plate 3 is not provided with the slot and the step that are matched with the block structure with the protruding portion.

In this embodiment, protruding edge structures matched with each other are provided between the other end of the annular piece 8 and the outer periphery of the movable core 6. The protruding edge structure includes an inner protruding edge 82 provided at the other end of the annular piece 8 and a periphery edge 27 on the bottom end of the movable core 2. Through the cooperation between the inner protruding edge 82 of the annular piece 8 and the periphery edge 27 on the bottom end of the movable core 2, the protruding edge structure restricts the movement of one end 81 of the annular piece 8 toward the magnetic pole surface 31 of the yoke plate 3, so as to ensure that there is a certain gap between one end 81 of the annular piece 8 and the magnetic pole surface 31 of the yoke plate in the state that the movable core 2 does not move.

In this embodiment, since the yoke plate 3 is above the movable core 2, in order to prevent the annular piece 8 from falling freely along the outer periphery edge of the movable core 2, a support spring 24 is also installed at the bottom end of the annular piece 8, and a metal shell 26 for supporting the support spring 24 is also provided under the support spring 24.

It should be understood that this disclosure would never be limited to the detailed construction and arrangement of components as set forth in this specification. The present disclosure has other implementations that are able to be practiced or carried out in various ways. The foregoing variations and modifications fall within the scope of this disclosure. It should be understood that the present disclosure would contain all alternative combination of two or more individual features as mentioned or distinguished from in the text and/or in the drawings. All of these different combinations constitute a number of alternative aspects of the present disclosure. The implementations as illustrated in this specification are the best modes known to achieve the present disclosure and will enable the person skilled in the art to realize the present disclosure.

What is claimed is:

1. A magnetic circuit system with enhanced initial electromagnetic attraction, comprising:

a movable magnetizer and a stationary magnetizer; the movable magnetizer and the stationary magnetizer being respectively provided at a suitable position, so that a magnetic pole surface of the movable magnetizer and a magnetic pole surface of the stationary magnetizer are in opposite positions with preset magnetic gaps, two magnetic pole surfaces correspondingly matched with each other are respectively in a ring shape and respectively has an inner ring and an outer ring;

a coil, being provided at an adaptive position, so that the movable magnetizer moves towards the stationary magnetizer when the coil is energized;

a reset spring, the reset spring is adapted between an intermediate portion of the movable magnetizer and an intermediate portion of the stationary magnetizer;

wherein one of the two magnetic pole surfaces correspondingly matched with each other is provided with a protrusion protruding to the other magnetic pole surface, and a recess is provided in the other magnetic pole surface at a position corresponding to the protrusion, where the protrusion can be embedded into the recess when the movable magnetizer and the stationary magnetizer are attracted with each other; each of the protrusion and the recess has distances from the inner ring and the outer ring of corresponding magnetic pole surfaces; when the coil is energized, a direction of a resultant force of attractive forces between the protrusion and the recess generated on both sides of a vertical section in which the protrusion and the recess are matched with each other is always along a direction in which the movable magnetizer moves to the stationary magnetizer, and the protrusion is utilized to reduce a magnetic gap between the two magnetic pole surfaces at the protrusion, thereby reducing magnetic resistance and increasing initial electromagnetic attraction.

2. The magnetic circuit system with enhanced initial electromagnetic attraction according to claim 1, wherein a top face of the protrusion is a plane, and in a state that the protrusion is fully embedded in the recess, gaps between side faces of the protrusion and corresponding side walls of the recess are completely identical, so that the direction of the resultant force of the attractive forces generated between the protrusion and the recess when the coil is energized is always along the direction in which the movable magnetizer moves to the stationary magnetizer.

3. The magnetic circuit system with enhanced initial electromagnetic attraction according to claim 2, wherein a distance from a side edge of the top face of the protrusion to a side edge of a corresponding notch of the recess is smaller than the preset magnetic gap between the two magnetic pole surfaces.

4. The magnetic circuit system with enhanced initial electromagnetic attraction according to claim 3, wherein in the state that the protrusion is totally embedded in the recess, a gap between the side face of the protrusion and the side wall of the recess is not smaller than a distance between the top face of the protrusion and a bottom face of the recess, and the distance between the top face of the protrusion and the bottom face of the recess is not smaller than a distance between two magnetic pole surfaces.

5. The magnetic circuit system with enhanced initial electromagnetic attraction according to claim 1, wherein the side face of the protrusion is one or a combination of more than two of a vertical surface, an inclined surface and a curved surface, and in the vertical section, the two side faces of the protrusion are symmetrical.

6. The magnetic circuit system with enhanced initial electromagnetic attraction according to claim 1, wherein there are one or more protrusions on one magnetic pole surface, and there are one or more recesses on the other magnetic pole surface at a corresponding position.

7. The magnetic circuit system with enhanced initial electromagnetic attraction according to claim 6, wherein a sum of areas of the top faces of the protrusions on the magnetic pole surface is less than a remaining area of the magnetic pole surface removed all of the protrusions.

8. The magnetic circuit system with enhanced initial electromagnetic attraction according to claim 1, wherein the protrusion is a separate part, and the protrusion is fixed on the magnetic pole surface.

9. The magnetic circuit system with enhanced initial electromagnetic attraction according to claim 1, wherein the protrusion is an integral structure formed on the magnetic pole surface.

10. The magnetic circuit system with enhanced initial electromagnetic attraction according to claim 1, wherein the protrusion is in a protruding shaft shape.

11. The magnetic circuit system with enhanced initial electromagnetic attraction according to claim 1, wherein the protrusion is in a strip shape.

12. The magnetic circuit system with enhanced initial electromagnetic attraction according to claim 1, wherein the protrusion is linear, arc-shaped or annular.

13. The magnetic circuit system with enhanced initial electromagnetic attraction according to claim 1, wherein the movable magnetizer is a movable core, and the stationary magnetizer is a stationary core or a yoke plate.

14. A high-voltage DC relay, comprising a magnetic circuit system with enhanced initial electromagnetic attraction comprising:

a movable magnetizer and a stationary magnetizer; the movable magnetizer and the stationary magnetizer being respectively provided at a suitable position, so that a magnetic pole surface of the movable magnetizer and a magnetic pole surface of the stationary magnetizer are in opposite positions with preset m retic gaps, two magnetic pole surfaces correspondingly matched with each other are respectively in a ring shape and respectively has an inner ring and an outer ring;

a coil, being provided at an adaptive position, so that the moveable magnetizer moves towards the stationary magnetizer when the coil is energized;

a reset spring, the reset spring is adapted between an intermediate portion of the movable magnetizer and an intermediate portion of the stationary magnetizer;

wherein one of the two magnetic pole surfaces correspondingly matched with each other is provided with a protrusion protruding to the other magnetic pole surface, and a recess is provided in the other magnetic pole surface at a position corresponding to the protrusion, where the protrusion can be embedded into the recess when the moveable magnetizer and the stationary magnetizer are attracted with each other; each of the protrusion and the recess has distances from the inner ring and the outer ring of corresponding magnetic pole surfaces; when the coil is energized, a direction of a resultant force of attractive forces between the protrusion and the recess generated on both sides of a vertical section in which the protrusion and the recess are matched with each other is always along a direction in which the moveable magnetizer moves to the stationary magnetizer, and the protrusion is utilized to reduce a magnetic resistance and increasing initial electromagnetic attraction.

15. The high-voltage DC relay according to claim 14, wherein a top face of the protrusion is a plane, and in a state that the protrusion is fully embedded in the recess, gaps between side faces of the protrusion and corresponding side walls of the recess are completely identical, so that the direction of the resultant force of the attractive forces generated between the protrusion and the recess when the coil is energized is always along the direction in which the moveable magnetizer moves to the stationary magnetizer.

16. The high-voltage DC relay according to claim 15, wherein a distance from a side edge of the top face of the protrusion to a side edge of a corresponding notch of the recess is smaller than the preset magnetic gap between the two magnetic pole surfaces.

17. The high-voltage DC relay according to claim 16, wherein in the state that the protrusion is totally embedded in the recess, a gap between the side face of the protrusion and the side wall of the recess is not smaller than a distance between the top face of the protrusion and a bottom face of the recess, and the distance between the top face of the protrusion and the bottom face of the recess is not smaller than a distance between two magnetic pole surfaces.

18. The high-voltage DC relay according to claim 14, wherein the side fac of the protrusion is one or a combination of more than two of a vertical surface, an inclined surface and a curved surface, and in the vertical section, the two side faces of the protrusion are symmetrical.

19. The high-voltage DC relay according to claim 14, wherein there are one or mor protrusions on one magnetic pole surface, and there are one or more recesses on the other magnetic pole surface at a corresponding position.

20. The high-voltage DC relay according to claim 19, wherein a sum of areas of the top faces of the protrusions on the magnetic pole surface is less than a remaining area of the magnetic pole surface removed all of the protrusions.

* * * * *